US012666429B2

(12) United States Patent
Xing et al.

(10) Patent No.: US 12,666,429 B2
(45) Date of Patent: Jun. 23, 2026

(54) HARQ-ACK TRANSMISSION METHOD AND APPARATUS

(71) Applicant: HUAWEI TECHNOLOGIES CO., LTD., Shenzhen (CN)

(72) Inventors: Shuangshuang Xing, Shenzhen (CN); Yiqun Wu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 611 days.

(21) Appl. No.: 18/147,032

(22) Filed: Dec. 28, 2022

(65) Prior Publication Data

US 2023/0134484 A1 May 4, 2023

Related U.S. Application Data

(63) Continuation of application No. PCT/CN2021/103760, filed on Jun. 30, 2021.

(30) Foreign Application Priority Data

Jul. 1, 2020 (CN) .......................... 202010632654.1

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04W 72/0453* (2013.01); *H04W 74/0841* (2013.01)

(58) Field of Classification Search
CPC ............. H04W 72/21; H04W 72/0453; H04W 74/0841; H04W 28/04; H04W 74/085;
(Continued)

(56) References Cited

U.S. PATENT DOCUMENTS

| 11,582,807 B2 * | 2/2023 | Wei .................... H04W 74/0833 |
| 11,968,670 B2 * | 4/2024 | Datta .................... H04W 72/21 |

(Continued)

FOREIGN PATENT DOCUMENTS

| CN | 109586883 A | 4/2019 |
| CN | 109802749 A | 5/2019 |

(Continued)

OTHER PUBLICATIONS

Qualcomm Incorporated: "Multi-TRP Enhancements", 3GPP Draft; R1-1900905 Jan. 12, 2019, pp. 1-26, XP051576442.

(Continued)

*Primary Examiner* — Brian T O Connor
(74) *Attorney, Agent, or Firm* — HAUPTMAN HAM, LLP

(57) ABSTRACT

A HARQ-ACK transmission method and an apparatus. A network device configures at least two common PUCCH resource sets for a terminal device, and sends, to the terminal device, configuration information indicating the at least two common PUCCH resource sets. After receiving the configuration information from the network device, the terminal device determines, from the at least two common PUCCH resource sets, a first PUCCH resource used to send HARQ-ACK information, and sends the HARQ-ACK information to the network device based on the first PUCCH resource. Available PUCCH frequency domain resources are able to be added for the terminal device in a same slot. PUCCH frequency domain resource collision is reduced, and a transmission delay that is increased to avoid the PUCCH frequency domain resource collision is reduced.

20 Claims, 7 Drawing Sheets

(51) Int. Cl.

*H04W 72/0453*     (2023.01)

*H04W 74/0833*     (2024.01)

(58) Field of Classification Search

CPC ... H04L 1/1812; H04L 5/0055; H04L 5/0094; H04L 1/1858; H04L 1/1864; H04L 5/0053; H04L 1/1854

See application file for complete search history.

(56)                References Cited

U.S. PATENT DOCUMENTS

| | | | |
|---|---|---|---|
| 11,985,511 B2 * | 5/2024 | Babaei | H04W 72/21 |
| 2019/0104517 A1 * | 4/2019 | Park | H04W 72/21 |
| 2020/0053580 A1 | 2/2020 | Bagheri et al. | |
| 2020/0295903 A1 * | 9/2020 | Faxér | H04L 5/0057 |
| 2020/0367244 A1 * | 11/2020 | Yang | H04L 5/0091 |
| 2021/0105764 A1 * | 4/2021 | Datta | H04L 5/0016 |
| 2021/0144769 A1 * | 5/2021 | Wei | H04W 74/0833 |
| 2023/0007699 A1 * | 1/2023 | Wei | H04W 74/0833 |
| 2023/0180237 A1 * | 6/2023 | Yoshimura | H04L 1/1896 |
| | | | 370/329 |
| 2023/0354432 A1 * | 11/2023 | Behravan | H04W 8/24 |
| 2023/0421330 A1 * | 12/2023 | Faxér | H04W 24/10 |
| 2024/0381368 A1 * | 11/2024 | Cirik | H04W 72/23 |

FOREIGN PATENT DOCUMENTS

| | | |
|---|---|---|
| CN | 110392994 A | 10/2019 |
| CN | 110535608 A | 12/2019 |
| CN | 111345092 A | 6/2020 |
| WO | 2019098693 A1 | 5/2019 |

OTHER PUBLICATIONS

Extended European Search Report issued in corresponding European Application No. 21831798.0, dated Oct. 9, 2023, pp. 1-9.

Ericsson, NR two-step random access procedure. 3GPP TSG-RAN WG1 NR adhoc, Spokane, USA, Jan. 16-20, 2017, R1-1700300, 4 pages.

3GPP TS 38.214 V16.1.0 (Mar. 2020), 3rd Generation Partnership Project; Technical Specification Group Radio Access Network; NR; Physical layer procedures for data(Release 16), 151 pages.

3GPP TS 38.321 V16.0.0 (Mar. 2020), 3rd Generation Partnership Project; Technical Specification Group Radio Access Network; NR; Medium Access Control (MAC) protocol specification(Release 16), 141 pages.

International Search Report issued in corresponding International Application No. PCT/CN2021/103760, dated Sep. 22, 2021, pp. 1-9.

* cited by examiner

S201: MsgA, where the MsgA includes a preamble and a PUSCH

S202: Send a response message MsgB, including a PDCCH and a success random access response PUCCH (carrying a HARQ-ACK)

Network device

Terminal device

HARQ-ACK TRANSMISSION METHOD AND APPARATUS

CROSS-REFERENCE TO RELATED APPLICATION

This application is a continuation of International Application No. PCT/CN2021/103760, filed on Jun. 30, 2021, which claims priority to Chinese Patent Application No. 202010632654.1, filed on Jul. 1, 2020. The disclosures of the aforementioned applications are hereby incorporated by reference in their entireties.

TECHNICAL FIELD

This application relates to the field of communication technologies, and in particular, to a hybrid automatic repeat request-acknowledgement (hybrid automatic repeat request-acknowledgement, HARQ-ACK) transmission method and an apparatus.

BACKGROUND

In a 5th generation (the 5th generation, 5G) mobile communication technology new radio (new radio, NR) system, when a terminal device performs HARQ-ACK transmission, if a specific physical uplink control channel (physical uplink control channel, PUCCH) frequency domain resource (namely, a dedicated PUCCH frequency domain resource) is configured for the terminal device, the terminal device selects, from the dedicated PUCCH frequency domain resource based on a PUCCH resource indicator (PUCCH resource indicator, PRI) sent by a network device, a PUCCH frequency domain resource used to send HARQ feedback information (for example, a HARQ-ACK). If no specific PUCCH frequency domain resource is configured for the terminal device, the terminal device selects, from a common PUCCH resource set based on a PRI sent by the network device, a PUCCH frequency domain resource used to send HARQ-ACK information.

Currently, when the network device configures the common PUCCH resource set for the terminal device, all terminal devices in a same cell share one common PUCCH resource set, where the common PUCCH resource set includes a total of 16 PUCCH frequency domain resources. As a result, the network device can schedule a maximum of 16 PUCCH frequency domain resources in a same slot. In a massive connection scenario, a PUCCH frequency domain resource collision is very likely to occur between terminal devices. Although controlling a PUCCH time domain transmission moment can reduce a possibility of a PUCCH frequency domain resource collision to some extent, a HARQ-ACK transmission delay is increased. In this case, it is always difficult to meet a requirement of the 5G NR system for an ultra-reliable low-latency communication (ultra-reliable low-latency communication, URLLC) service scenario.

SUMMARY

Embodiments of this application provide a HARQ-ACK transmission method and an apparatus, to reduce a possibility of a PUCCH frequency domain resource collision and a random access delay of a terminal device, so that random access efficiency of the terminal device is improved.

According to a first aspect, an embodiment of this application provides a method for sending a HARQ-ACK. The method may be applied to a terminal device, or may be applied to a chip in a terminal device. For example, the method may be applied to the terminal device. In the method, the terminal device receives configuration information from a network device, where the configuration information indicates at least two common PUCCH resource sets configured by the network device for the terminal device. The terminal device then determines a first PUCCH resource from the at least two common PUCCH resource sets. The terminal device sends HARQ-ACK information to the network device based on the first PUCCH resource.

According to this method, the network device can configure the at least two common PUCCH resource sets for the terminal device, and the terminal device can determine a common PUCCH resource (namely, the first PUCCH resource) used to send the HARQ-ACK information from the at least two common PUCCH resource sets, so that more available PUCCH frequency domain resources can be added for the terminal device in a same slot. Therefore, a possibility of a PUCCH frequency domain resource collision can be reduced, and a transmission delay that is increased to avoid a PUCCH frequency domain resource collision can be reduced, so that random access efficiency of the terminal device is improved.

In a possible design, the terminal device may determine the first PUCCH resource from the at least two common PUCCH resource sets based on a first PRI from the network device, where the first PRI is used to determine a resource location of the first PUCCH resource in the at least two common PUCCH resource sets, a value of the first PRI is an integer greater than or equal to 0 and less than a first preset value, and the first preset value is a total quantity of PUCCH resources in the at least two common PUCCH resource sets.

In this way, the network device may indicate, based on the first PRI, a common PUCCH resource set used by the terminal device and the first PUCCH resource used by the terminal device, to dynamically indicate and adjust an available common PUCCH resource set. In addition, no more configuration signaling needs to be added to indicate the common PUCCH resource set used by the terminal device, so that system overheads can be reduced.

In a possible design, that the terminal device determines the first PUCCH resource from the at least two common PUCCH resource sets based on a first PRI from the network device includes: The terminal device determines a value range within which the value of the first PRI falls, and determines, from the at least two common PUCCH resource sets, a common PUCCH resource set corresponding to the value range within which the value of the first PRI falls, where different common PUCCH resource sets in the at least two common PUCCH resource sets correspond to different value ranges. The terminal device determines, based on the value of the first PRI, the first PUCCH resource from the common PUCCH resource set corresponding to the value range within which the value of the first PRI falls.

In this way, the terminal device may determine the used common PUCCH resource set based on the value range within which the value of the first PRI falls, and then determine the used PUCCH resource, namely, the first PUCCH resource, from the used common PUCCH resource set based on the value of the first PRI, to ensure reliability of the solution.

In a possible design, the first PRI may have a plurality of value ranges. For example, the first PRI has two value ranges: a first value range and a second value range. If the value of the first PRI falls within the first value range, the value of the first PRI is an index of the first PUCCH resource in a first common PUCCH resource set. If the value of the first PRI falls within the second value range, the value of the first PRI minus a second preset value is an index of the first PUCCH resource in a second common PUCCH resource set.

When the first PRI is located in different value ranges, used common PUCCH resource sets are different, and manners of calculating an index of the used common PUCCH resource set of the first PRI are also different. In this way, it can be ensured that each value of the first PRI corresponds to a unique PUCCH resource in a unique common PUCCH resource set, so that the reliability of the solution is further ensured.

In a possible design, an index of the first common PUCCH resource set plus a third preset value is an index of the second common PUCCH resource set.

In this way, the network device may indirectly indicate an index of another common PUCCH resource set by indicating an index of one PUCCH resource set. For example, if the network device indicates the index of the first common PUCCH resource set, the index of the first common PUCCH resource set plus the third preset value is the index of the second common PUCCH resource set; or if the network device indicates the index of the second common PUCCH resource set, the index of the second common PUCCH resource set minus the third preset value is the index of the first common PUCCH resource set, so that system indication overheads can be reduced.

In a possible design, the terminal device may determine a first common PUCCH resource set from the at least two common PUCCH resource sets. The terminal device determines the first PUCCH resource from the first common PUCCH resource set based on a second PRI from the network device, where the second PRI indicates a resource location of the first PUCCH resource in the first common PUCCH resource set.

In this way, the second PRI indicates the resource location of the first PUCCH resource in the first common PUCCH resource set, and a definition of a PRI in an existing protocol does not need to be changed, so that complexity of implementing the solution is reduced.

In a possible design, that the terminal device determines a first common PUCCH resource set from the at least two common PUCCH resource sets includes: The terminal device determines the first common PUCCH resource set from the at least two common PUCCH resource sets based on a common PUCCH resource set indicator from the network device, where the common PUCCH resource set indicator indicates the first common PUCCH resource set in the at least two common PUCCH resource sets.

In this way, the common PUCCH resource set indicator indicates the common PUCCH resource set used by the terminal device, so that an implementation is simple, and an available common PUCCH resource set can be dynamically indicated and adjusted.

In a possible design, the at least two common PUCCH resource sets are associated with at least two uplink transmission resource configurations. That the terminal device determines a first common PUCCH resource set from the at least two common PUCCH resource sets includes: The terminal device determines a first uplink transmission resource configuration used by the terminal device in an uplink transmission process, and determines a common PUCCH resource set associated with the first uplink transmission resource configuration as the first common PUCCH resource set.

In this way, a common PUCCH resource set index is associated with the uplink transmission resource configuration, so that the network device configures a common PUCCH resource set to be used for the terminal device when configuring the uplink transmission resource configuration for the terminal device, so that an available common PUCCH resource set can be dynamically indicated and adjusted. In addition, no more configuration signaling needs to be added to indicate the common PUCCH resource set used by the terminal device, so that system overheads can be reduced.

In a possible design, the uplink transmission resource configuration includes one or more of a PUSCH resource, a preamble set, a physical random access channel PRACH resource, or a coverage enhancement level.

In this way, a plurality of methods for associating the common PUCCH resource set index with the uplink transmission resource configuration are provided, so that flexibility of a solution can be improved.

In a possible design, any two PUCCH resources in the at least two common PUCCH resource sets are orthogonal in frequency domain.

In this way, a collision between PUCCH resources determined by different terminal devices can be avoided, and a possibility of successfully sending a HARQ-ACK can be improved.

According to a second aspect, an embodiment of this application provides a method for receiving a HARQ-ACK. The method may be applied to a network device, or may be applied to a chip in a network device. For example, the method is applied to the network device. The method includes: A network device sends configuration information to a terminal device, where the configuration information indicates at least two common PUCCH resource sets configured by the network device for the terminal device. The network device receives HARQ-ACK information from the terminal device, where the HARQ-ACK information is sent by the terminal device based on a first PUCCH resource in the at least two common PUCCH resource sets.

In a possible design, the method further includes: The network device sends a first PRI to the terminal device, where the first PRI is used to determine a resource location of the first PUCCH resource in the at least two common PUCCH resource sets, a value of the first PRI is an integer greater than or equal to 0 and less than a first preset value, and the first preset value is a total quantity of PUCCH resources in the at least two common PUCCH resource sets.

In a possible design, a value range within which the value of the first PRI falls corresponds to one of the at least two common PUCCH resource sets, and different common PUCCH resource sets in the at least two common PUCCH resource sets correspond to different value ranges.

In a possible design, if the value of the first PRI falls within a first value range, the value of the first PRI is an index of the first PUCCH resource in a first common PUCCH resource set. Alternatively, if the value of the first PRI falls within a second value range, the value of the first PRI minus a second preset value is an index of the first PUCCH resource in a second common PUCCH resource set.

In a possible design, an index of the first common PUCCH resource set plus a third preset value is an index of the second common PUCCH resource set.

In a possible design, the method further includes: The network device sends a second PRI to the terminal device, where the second PRI indicates a resource location of the first PUCCH resource in a first common PUCCH resource set.

In a possible design, the method further includes: The network device sends a common PUCCH resource set

5 indicator to the terminal device, where the common PUCCH resource set indicator indicates the first common PUCCH resource set in the at least two common PUCCH resource sets.

In a possible design, the at least two common PUCCH resource sets are associated with at least two uplink transmission resource configurations. The first common PUCCH resource set is associated with a first uplink transmission resource configuration used by the terminal device in an uplink transmission process.

In a possible design, the uplink transmission resource configuration includes one or more of a PUSCH resource, a preamble set, a physical random access channel PRACH resource, or a coverage enhancement level.

In a possible design, any two PUCCH resources in the at least two common PUCCH resource sets are orthogonal in frequency domain.

According to a third aspect, an embodiment of this application provides a communication apparatus for sending a HARQ-ACK. The apparatus may be, for example, a terminal device or a chip in a terminal device. The apparatus has a function of implementing any one of the first aspect or the possible designs of the first aspect. For example, the apparatus includes a corresponding module, unit, or means (means) for performing a step in the first aspect or any one of the possible designs of the first aspect. The function, unit, or means may be implemented by software or hardware. Alternatively, the function, unit, or means may be implemented by executing corresponding software by hardware.

For example, the apparatus may include:

a receiving module, configured to receive configuration information from a network device, where the configuration information indicates at least two common PUCCH resource sets configured by the network device for the apparatus;

a processing module, configured to determine a first PUCCH resource from the at least two common PUCCH resource sets; and a sending module, configured to send HARQ-ACK information to the network device based on the first PUCCH resource.

In a possible design, the processing module is specifically configured to:

determine the first PUCCH resource from the at least two common PUCCH resource sets based on a first PRI from the network device, where the first PRI is used to determine a resource location of the first PUCCH resource in the at least two common PUCCH resource sets, a value of the first PRI is an integer greater than or equal to 0 and less than a first preset value, and the first preset value is a total quantity of PUCCH resources in the at least two common PUCCH resource sets.

In a possible design, the processing module is specifically configured to:

determine a value range within which the value of the first PRI falls, and determine, from the at least two common PUCCH resource sets, a common PUCCH resource set corresponding to the value range within which the value of the first PRI falls, where different common PUCCH resource sets in the at least two common PUCCH resource sets correspond to different value ranges; and determine, based on the value of the first PRI, the first PUCCH resource from the common PUCCH resource set corresponding to the value range within which the value of the first PRI falls.

In a possible design, if the value of the first PRI falls within a first value range, the value of the first PRI is an index of the first PUCCH resource in a first common PUCCH resource set; or if the value of the first PRI falls within a second value range, the value of the first PRI minus a second preset value is an index of the first PUCCH resource in a second common PUCCH resource set.

In a possible design, an index of the first common PUCCH resource set plus a third preset value is an index of the second common PUCCH resource set.

In a possible design, the processing module is specifically configured to:

determine a first common PUCCH resource set from the at least two common PUCCH resource sets; and determine the first PUCCH resource from the first common PUCCH resource set based on a second PRI from the network device, where the second PRI indicates a resource location of the first PUCCH resource in the first common PUCCH resource set.

In a possible design, when determining the first common PUCCH resource set from the at least two common PUCCH resource sets, the processing module is specifically configured to:

determine the first common PUCCH resource set from the at least two common PUCCH resource sets based on a common PUCCH resource set indicator from the network device, where the common PUCCH resource set indicator indicates the first common PUCCH resource set in the at least two common PUCCH resource sets.

In a possible design, the at least two common PUCCH resource sets are associated with at least two uplink transmission resource configurations.

When determining the first common PUCCH resource set from the at least two common PUCCH resource sets, the processing module is specifically configured to:

determine a first uplink transmission resource configuration used by the apparatus in an uplink transmission process, and determine a common PUCCH resource set associated with the first uplink transmission resource configuration as the first common PUCCH resource set.

In a possible design, the uplink transmission resource configuration includes one or more of a PUSCH resource, a preamble set, a physical random access channel PRACH resource, or a coverage enhancement level.

In a possible design, any two PUCCH resources in the at least two common PUCCH resource sets are orthogonal in frequency domain.

According to a fourth aspect, an embodiment of this application provides a communication apparatus for receiving a HARQ-ACK. The apparatus may be, for example, a network device or a chip in a network device. The apparatus has a function of implementing any one of the second aspect or the possible designs of the second aspect. For example, the apparatus includes a corresponding module, unit, or means (means) for performing a step in the second aspect or any one of the possible designs of the second aspect. The function, unit, or means may be implemented by software or hardware. Alternatively, the function, unit, or means may be implemented by executing corresponding software by hardware.

For example, the apparatus may include:

a sending module, configured to send configuration information to a terminal device, where the configuration information indicates at least two common PUCCH resource sets configured by the apparatus for the terminal device; and a receiving module, configured to receive HARQ-ACK information from the terminal device, where the HARQ-ACK information is sent by the terminal device based on a first PUCCH resource in the at least two common PUCCH resource sets.

In a possible design, the sending module is further configured to:

send a first PRI to the terminal device, where the first PRI is used to determine a resource location of the first PUCCH resource in the at least two common PUCCH resource sets, a value of the first PRI is an integer greater than or equal to 0 and less than a first preset value, and the first preset value is a total quantity of PUCCH resources in the at least two common PUCCH resource sets.

In a possible design, a value range within which the value of the first PRI falls corresponds to one of the at least two common PUCCH resource sets, and different common PUCCH resource sets in the at least two common PUCCH resource sets correspond to different value ranges.

In a possible design, if the value of the first PRI falls within a first value range, the value of the first PRI is an index of the first PUCCH resource in a first common PUCCH resource set; or if the value of the first PRI falls within a second value range, the value of the first PRI minus a second preset value is an index of the first PUCCH resource in a second common PUCCH resource set.

In a possible design, an index of the first common PUCCH resource set plus a third preset value is an index of the second common PUCCH resource set.

In a possible design, the sending module is further configured to:

send a second PRI to the terminal device, where the second PRI indicates a resource location of the first PUCCH resource in a first common PUCCH resource set.

In a possible design, the sending module is further configured to:

send a common PUCCH resource set indicator to the terminal device, where the common PUCCH resource set indicator indicates the first common PUCCH resource set in the at least two common PUCCH resource sets.

In a possible design, the at least two common PUCCH resource sets are associated with at least two uplink transmission resource configurations.

the first common PUCCH resource set is associated with a first uplink transmission resource configuration used by the terminal device in an uplink transmission process.

In a possible design, the uplink transmission resource configuration includes one or more of a PUSCH resource, a preamble set, a physical random access channel PRACH resource, or a coverage enhancement level.

In a possible design, any two PUCCH resources in the at least two common PUCCH resource sets are orthogonal in frequency domain.

According to a fifth aspect, an embodiment of this application provides a communication apparatus, including:

at least one processor and a communication interface that are communicatively connected to the at least one processor. The at least one processor executes instructions stored in a memory, so that the apparatus performs the method according to the first aspect or any one of the possible designs of the first aspect.

Optionally, the memory is located outside the apparatus.

Optionally, the apparatus includes the memory. The memory is connected to the at least one processor, and the memory stores the instructions that can be executed by the at least one processor.

According to a sixth aspect, an embodiment of this application provides a communication apparatus, including:

at least one processor and a communication interface that are communicatively connected to the at least one processor. The at least one processor executes instructions stored in a memory, so that the apparatus performs the method according to the second aspect or any one of the possible designs of the second aspect.

Optionally, the memory is located outside the apparatus.

Optionally, the apparatus includes the memory. The memory is connected to the at least one processor, and the memory stores the instructions that can be executed by the at least one processor.

According to a seventh aspect, an embodiment of this application provides a computer-readable storage medium, including a program or instructions. When the program or the instructions are run on a computer, the method according to the first aspect or any one of the possible designs of the first aspect is performed.

According to an eighth aspect, an embodiment of this application provides a computer-readable storage medium, including a program or instructions. When the program or the instructions are run on a computer, the method according to the second aspect or any one of the possible designs of the second aspect is performed.

According to a ninth aspect, a chip is provided. The chip is coupled to a memory, and is configured to read and execute program instructions stored in the memory, so that the method according to the first aspect or any one of the possible designs of the first aspect is performed.

According to a tenth aspect, a chip is provided. The chip is coupled to a memory, and is configured to read and execute program instructions stored in the memory, so that the method according to the second aspect or any one of the possible designs of the second aspect is performed.

According to an eleventh aspect, a computer program product is provided, including instructions. When the instructions are run on a computer, the method according to the first aspect or any one of the possible designs of the first aspect is performed.

According to a twelfth aspect, a computer program product is provided, including instructions. When the instructions are run on a computer, the method according to the second aspect or any one of the possible designs of the second aspect is performed.

According to a thirteenth aspect, a communication system is provided. The communication system includes a terminal device and a network device. The terminal device is configured to perform the method according to the first aspect or any one of the possible designs of the first aspect, and the network device is configured to perform the method according to the second aspect or any one of the possible designs of the second aspect.

DESCRIPTION OF EMBODIMENTS

To make objectives, technical solution, and advantages of embodiments of this application clearer, the following further describes embodiments of this application in detail with reference to the accompanying drawings.

It should be understood that the terms "system" and "network" may be used interchangeably in embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

A 3rd generation partnership project (3rd generation partnership project, 3GPP) oriented to a fifth generation (5th generation, 5G) mobile communication technology includes three major application scenarios: enhanced mobile broadband (enhanced mobile broadband, eMBB), ultra-reliable low-latency communication (Ultra-Reliable Low-Latency Communication, URLLC), and massive machine type communication (massive machine type communication, mMTC). In a conventional mobile broadband (mobile broadband, eMBB) service scenario, a wireless transmission service does not have a high transmission latency requirement, an MBB service packet transmitted each time is large, and a corresponding overhead proportion of a control channel transmitted along with a data channel is low. Therefore, when the terminal device in an idle (idle) state or an inactive (inactive) state needs to initiate random access, a four-step random access (4-step physical random access channel, 4-Step RACH) procedure is usually used to complete a random access process.

Figure 1:
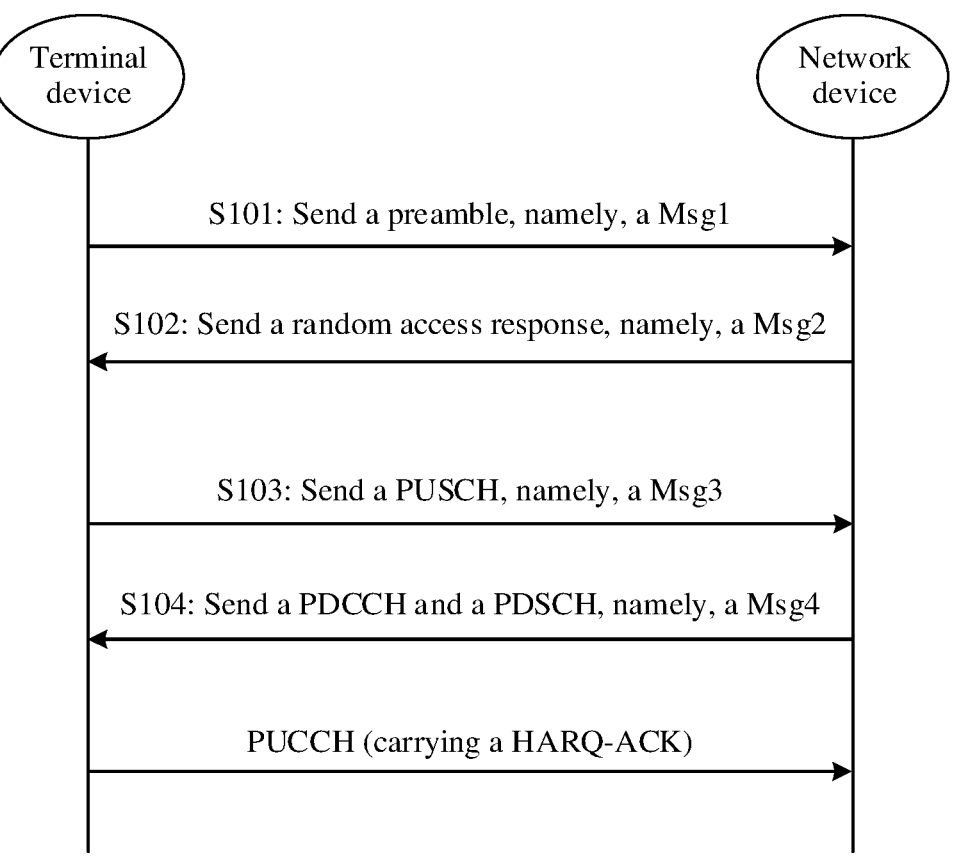
FIG. 1 is a flowchart of a 4-step RACH according to an embodiment of this application.

FIG. 1 is a flowchart of a 4-step RACH according to an embodiment of this application. The 4-step RACH includes the following steps.

S101: A terminal device sends a preamble (preamble) to a network device, where the preamble is represented by a Msg1.

Before this step, the terminal device needs to first receive a random access preconfiguration (RACH preconfiguration) sent by the network device. Specifically, the terminal device sends the preamble to the network device based on the random access preconfiguration.

S102: The network device sends a random access response (random access response) to the terminal device in response to the preamble sent by the terminal device, where the random access response is represented by a Msg2.

S103: The terminal device sends a physical uplink shared channel (physical uplink shared channel, PUSCH) to the network device, where the physical uplink shared channel is represented by a Msg3.

S104: The network device sends a physical downlink control channel (Physical downlink control channel, PDCCH) and a physical downlink shared channel (physical downlink shared channel, PDSCH) to the terminal device, where the physical downlink control channel and the physical downlink shared channel are represented by a Msg4.

In a 4-step RACH process, after the terminal device receives the Msg4 and successfully demodulates the Msg4, after receiving the Msg4 sent by the network device, the terminal device needs to send HARQ feedback (for example, HARQ-ACK) information to a base station, to notify the network device of a status of receiving the Msg4 by the terminal device. It should be understood that in this specification, the "HARQ feedback information" may also be referred to as "HARQ-ACK information", and the HARQ-ACK information includes two types: a HARQ-ACK and a HARQ-NACK.

A PUCCH time-frequency resource used for HARQ feedback transmission is indicated by downlink control information (downlink control information, DCI) for scheduling the PDSCH in the Msg4. Specifically, a frequency domain resource used for HARQ feedback transmission is determined based on a PUCCH resource indicator (PUCCH resource indicator, PRI) in the DCI, and a time domain resource used for HARQ feedback transmission is determined by a PDSCH-to-HARQ feedback timing indicator (PDSCH-to-HARQ feedback timing indicator) in the DCI.

Gradually, with the rapid development of URLLC, machine type communication (machine type communication, MTC), and an internet of things (internet of things, IoT), there are an increasing quantity of application scenarios for data transmission that requires sparse and small packets and a low latency. A latency introduced by multi-step interaction between the terminal device and the network side in the conventional 4-step RACH becomes a technical bottleneck in meeting transmission requirements of such data services.

Subsequently, two-step random access (2-step physical random access channel, 2-step RACH) is proposed as a mainstream solution for reducing the latency. A main idea of the two-step random access is to combine a first step and a third step of the conventional 4-step RACH into a first step, and to combine a second step and a fourth step of the RACH into a second step, so that a random access process is greatly accelerated.

Figure 2:
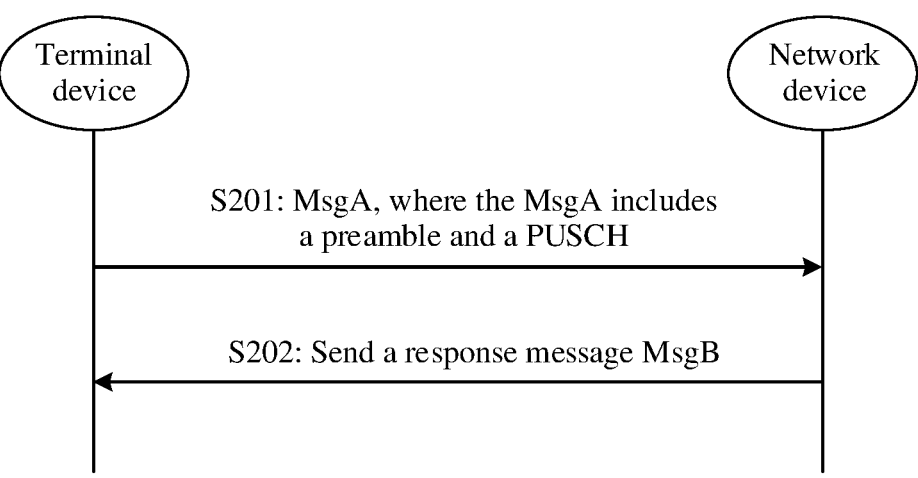
FIG. 2 is a flowchart of a 2-step RACH according to an embodiment of this application.

FIG. 2 is a flowchart of a 2-step RACH according to an embodiment of this application. The 2-step RACH includes the following steps.

S201: A terminal device sends a MsgA to a network device, where the MsgA includes a preamble and a PUSCH (equivalent to the Msg1 and the Msg3 in the 4-step RACH).

Likewise, before this step, the terminal device needs to first receive a RACH preconfiguration sent by the network device. Specifically, the terminal device sends the MsgA to the network device based on the RACH preconfiguration.

S202: The network device sends a response message MsgB to the terminal device in response to the MsgA sent by the terminal device, where content of the MsgB includes at least one of a response to the preamble and a response to the PUSCH.

Based on a status of detecting the preamble in the MsgA by the network device and a status of decoding the PUSCH in the MsgA by the network device, the MsgB includes the following two forms.

Figure 3A:
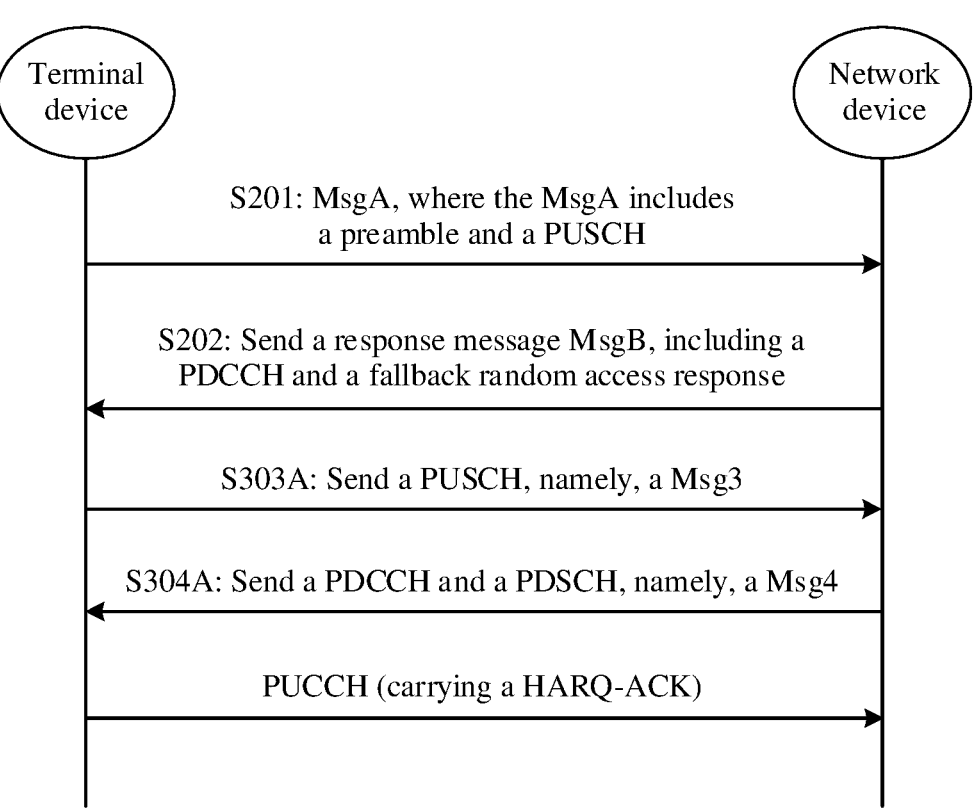
FIG. 3A is a more specific flowchart of a 2-step RACH according to an embodiment of this application.

For a first form, refer to FIG. 3A. The network device successfully detects only the preamble, but incorrectly decodes the PUSCH. In this case, the response message MsgB sent by the network device is the response to the preamble, and is referred to as a fallback random access response (fallbackRAR).

The fallbackRAR may include a preamble index (random access preamble index), a timing advance command (timing advance command, TA command), a temporary cell radio network temporary identifier (temporary C-RNTI, TC-RNTI), and an uplink scheduling grant (UL grant) that are carried in random access information. The uplink scheduling grant may be used to schedule the terminal device to send a Msg3, to implement retransmission of the PUSCH in the MsgA.

Correspondingly, as shown in FIG. 3A, after S202, the method further includes the following steps:

S303A: The terminal device sends the PUSCH to the network device, where the PUSCH is represented by the Msg3.

S304A: The network device sends a PDCCH and a PDSCH to the terminal device, where the PDCCH and the PDSCH are represented by a Msg4.

After the terminal device receives the Msg4 and successfully demodulates the Msg4, the terminal device sends HARQ-ACK information to the network device, to notify the network device of a status of receiving the Msg4 by the terminal device. For a specific form of a HARQ feedback herein, refer to the specific form of the HARQ feedback in FIG. 1. Details are not described herein again.

Figure 3B:
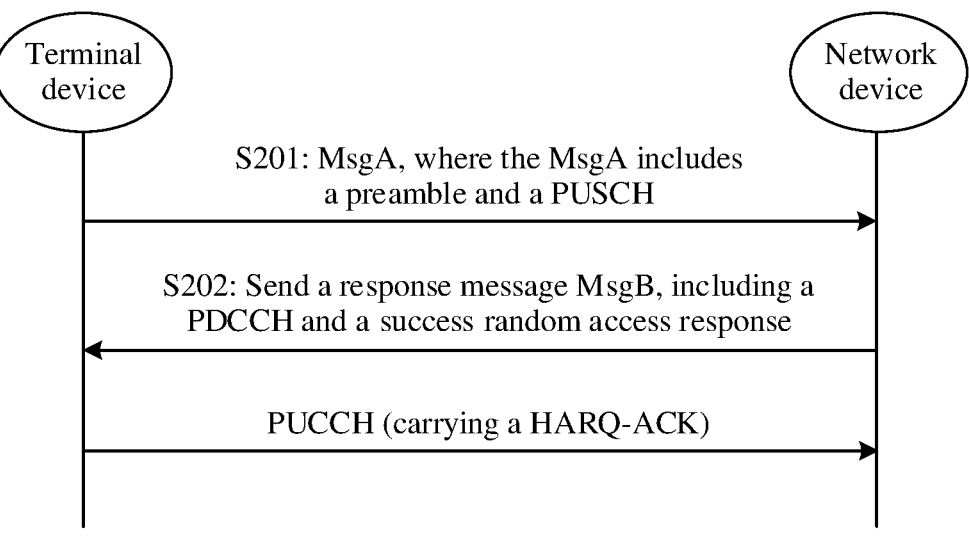
FIG. 3B is another more specific flowchart of a 2-step RACH according to an embodiment of this application.

For a second form, refer to FIG. 3B. The network device successfully detects the preamble, and successfully decodes the PUSCH. In this case, the response message MsgB sent by the network device includes the response to the preamble and/or the response to the PUSCH, and is referred to as a success random access response (successRAR). The successRAR is carried in a PDSCH.

The successRAR may include a contention resolution identifier (contention resolution ID), a timing advance command (TA command), a cell radio network temporary identifier C-RNTI, a PUCCH resource indicator (PUCCH resource indicator, PRI) for an uplink HARQ feedback, a PDSCH-to-HARQ feedback timing indicator (PDSCH-to-HARQ feedback timing indicator), and a transmit power control command (transmit power control command, TPC command) for PUCCH transmission.

After the terminal device determines that contention resolution succeeds, the terminal device sends HARQ-ACK information to the network device.

A PUCCH time-frequency resource used for HARQ feedback transmission is determined based on the PRI in the successRAR and the PDSCH-to-HARQ feedback timing indicator in the successRAR.

It can be learned from the foregoing that, regardless of the 4-step RACH or the 2-step RACH, the PUCCH frequency domain resource used to send the HARQ-ACK information to the network device after the terminal device determines that the contention resolution succeeds needs to be determined based on the PRI.

When specific PUCCH frequency domain resources are configured for the terminal device, the PUCCH frequency domain resource determined by the terminal device based on the PRI is selected from the specific PUCCH frequency domain resources.

When no specific PUCCH frequency domain resource is configured for the terminal device, the PUCCH frequency domain resource determined by the terminal device based on the PRI is selected from a common PUCCH resource set, and the available PUCCH resource set is configured by the network device by using an RRC configuration parameter (PUCCH-ResourceCommon). A common PUCCH resource is mainly used for a HARQ feedback after a terminal device in an idle state or an inactive state initiates random access and contention resolution succeeds.

A process in which the network device configures the common PUCCH resource for the terminal device includes the following steps.

(1) The network device configures the common PUCCH resource set for the terminal device, and indicates, to the terminal device by using PUCCH-ResourceCommon, the common PUCCH resource set configured for the terminal device.

Specifically, the network device configures a same common PUCCH resource set for all terminal devices in a same cell. An index (index) of the common PUCCH resource set carried in PUCCH-ResourceCommon indicates that a value of the index of the common PUCCH resource set is a positive integer ranging from 0 to 15.

Table 1 is a configuration table of PUCCH resource sets before dedicated PUCCH resource configuration (PUCCH resource sets before dedicated PUCCH resource configuration), namely, all common PUCCH resource sets supported by a network.

TABLE 1

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8 } |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |

TABLE 1-continued

| Index | PUCCH format | First symbol | Number of symbols | PRB offset $RB_{BWP}^{offset}$ | Set of initial CS indexes |
|---|---|---|---|---|---|
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

One row in Table 1 includes calculation parameters corresponding to one common PUCCH resource set. It may be learned from Table 1 that there are a total of 16 common PUCCH resource sets.

Parameters in Table 1 are described as follows:

Index: an index of a common PUCCH resource set;

PUCCH format: a PUCCH format (a size of information), where different formats have different bits and a quantity of available RBs is limited;

First symbol: a start position of a PUCCH in a slot;

Number of symbols: a number of PUCCH symbols in a slot (duration);

PRB offset $$PRB_{BWP}^{offset}:$$

used to calculate a position offset value of a PUCCH frequency domain resource; and Set of initial CS indexes: used to generate an initial cyclic shift index (a code domain parameter) for a PUCCH.

It may be learned from Table 1 that the network supports a total of 16 common PUCCH resource sets, and one of the 16 PUCCH resource sets is configured for the terminal devices in the same cell.

(2) The terminal device determines an available common PUCCH resource set based on an index or an ID (which may indicate a range of 0 to 16) indicated by PUCCH-Resource-Common.

(3) After the terminal device receives contention resolution sent by the network device and the contention resolution succeeds, the terminal device determines, based on a PRI carried in a PDSCH or a PRI carried in DCI for scheduling the PDSCH, a PUCCH frequency domain resource used for a HARQ feedback. A specific manner is that the terminal device selects, based on an index (which may indicate a range of 0 to 16) indicated by the PRI and from the determined common PUCCH resource set, the PUCCH frequency domain resource corresponding to the PRI. It should be understood that the index indicated by the PRI herein is an index of a common PUCCH resource in the common PUCCH resource set, and the index in Table 1 is an index of the common PUCCH resource set.

For example, in the 4-step RACH or the 2-step RACH, if a PRI is in DCI (where a PDCCH is of DCI format 1_0 or DCI format 1_1), the terminal device may determine, based on a PRI value and a start CCE index of the PDCCH, that an index $r_{PUCCH}$ of a PUCCH frequency domain resource is:

$$r_{PUCCH} = \left\lfloor \frac{2 \cdot n_{CCE,0}}{N_{CCE,0}} \right\rfloor + 2 \cdot \Delta_{PRI} \qquad (1)$$

$0 \leq r_{PUCCH} \leq 15$, $N_{CCE,0}$ is a quantity of control channel elements (control channel elements, CCEs, CCEs) in a control resource set (control resource set, CORESET) of the PDCCH that carries DCI format 1_0 or DCI format 1_1, $n_{CCE,0}$ is an index of a first CCE of the PDCCH, and PRI is a value of the PUCCH resource indicator in DCI format 1_0 or DCI format 1_1. In this case, a bit length of the PRI is 3 bits, and a value range is 0 to 7.

In the 2-step RACH, if a PUCCH resource indicator is carried in a successRAR in a PDSCH, the terminal device determines that an index $r_{PUCCH}$ of a PUCCH frequency domain resource is:

$$r_{PUCCH} = \Delta_{PRI} \qquad (2)$$

$0 \leq r_{PUCCH} \leq 15$, and $\Delta PRI$ is a value of the PUCCH resource indicator carried in the successRAR. In this case, a bit length of the PRI is 4 bits, and a value range is 0 to 15.

It can be learned from the foregoing that the terminal device needs to send the HARQ-ACK information to the network device in the 2-step RACH process or 4-step RACH process. When the terminal device is in the idle (idle) state or the inactive (inactive) state, the terminal device needs to use the PUCCH frequency domain resource in the common PUCCH resource set. However, a PUCCH resource indicator indicates a maximum of 16 PUCCH frequency domain resources. As a result, in a massive connection scenario, there are a maximum of 16 PUCCH frequency domain resources that can be scheduled in a same slot. If there is another access mode in a system at the same time, there is a high possibility of a PUCCH frequency domain resource collision.

For a PUCCH frequency domain resource used for a HARQ feedback, a time domain transmission moment of a PUCCH may be controlled by using a time domain offset value given in a PDSCH-to-HARQ feedback timing indicator, which reduces the possibility of the PUCCH frequency domain resource collision to some extent. However, this increases a random access delay of the terminal device.

In view of this, embodiments of this application provide a HARQ-ACK transmission solution, to reduce a possibility of a PUCCH frequency domain resource collision and a random access delay of a terminal device by adding more available PUCCH frequency domain resources in a same slot, so that random access efficiency is improved.

Technical solutions in embodiments of this application may be applied to various communication systems, for example, a 4th generation (4th generation, 4G) communication system, a 5th generation (5th generation, 5G) communication system, a 6th generation (6th generation, 6G) communication system, another future evolved system, and various other wireless communication systems using a radio access technology. The technical solutions in embodiments of this application may be applied provided that a scenario of using a common PUCCH resource exists in the communication system. For example, in a possible scenario, in a 5G communication system, a terminal device in an idle state or an inactive state sends HARQ-ACK information to a network based on a common PUCCH resource in a 2-step RACH or 4-step RACH process.

Figure 4:
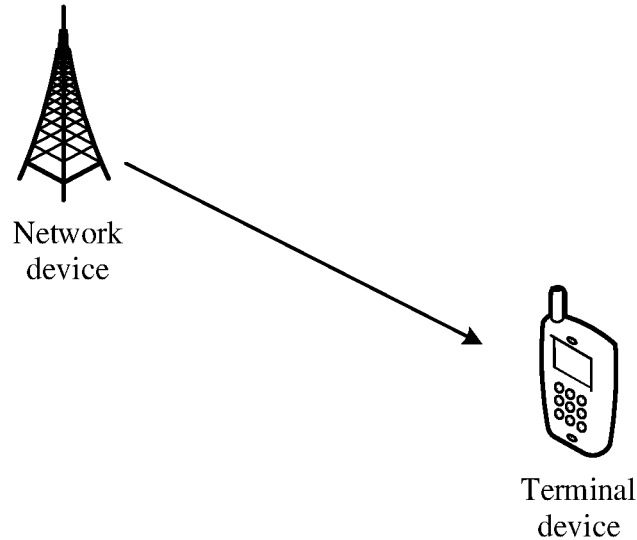
FIG. 4 is a diagram of a network architecture of a communication system to which an embodiment of this application is applicable.

FIG. 4 is a diagram of a network architecture of a communication system to which an embodiment of this application is applicable. The communication system includes a network device and a terminal device. The network device and the terminal device work in a 5G NR system, and the terminal device and the network device may communicate with each other by using the 5G NR system.

The terminal device may also be referred to as a terminal for short. The terminal device includes a device that provides a user with voice and/or data connectivity, for example, may include a handheld device having a wireless connection function or a processing device connected to a wireless modem. The terminal device may communicate with a core network through a radio access network (radio access network, RAN), and exchange a voice and/or data with the RAN. The terminal device may include user equipment (user equipment, UE), a wireless terminal, a mobile terminal, a device-to-device (device-to-device, D2D) terminal device, a V2X terminal, a machine-to-machine/machine type communication (machine-to-machine/machine type communication, M2M/MTC) terminal, an internet of things (internet of things, IoT) terminal, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal may include a mobile phone (or referred to as a "cellular" phone), a computer with a mobile terminal, or a portable, pocket-sized, handheld, or computer built-in mobile apparatus. For example, it may be a device such as a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If various terminal devices described above are located on a vehicle (for example, placed in the vehicle or installed in the vehicle), the terminal devices may be considered as in-vehicle terminals. The in-vehicle terminals are also referred to as, for example, on-board units (on-board units, OBUs).

The network device includes an access network (access network, AN) device and a radio access network (radio access network, RAN) device. The access network device, for example, a base station (for example, an access point), may be a device that communicates with a wireless terminal device over an air interface in an access network through one or more cells. The base station may be configured to mutually convert a received over-the-air frame and an internet protocol (IP) packet, and serve as a router between the terminal device and a remaining part of the access network. The remaining part of the access network may include an IP network. The network device may further coordinate attribute management of the air interface. For example, the network device may include an evolved NodeB (NodeB, eNB, or e-NodeB, evolved NodeB) in a long term evolution (long term evolution, LTE) system or a long term evolution-advanced (long term evolution-advanced, LTE-A) system; may include a next generation NodeB (next generation NodeB, gNB), a next generation evolved NodeB (next generation evolved NodeB, ng-eNB), or an enhanced next generation NodeB en-gNB (enhanced next generation NodeB, gNB) in a 5th generation (5th generation, 5G) mobile communication technology new radio (new radio, NR) system; may include a central unit (central unit, CU) and a distributed unit (distributed unit, DU) in a cloud access network (cloud radio access network, Cloud RAN) system; or may further include a relay device. This is not limited in embodiments of this application.

In addition, in embodiments of this application, the network device may further include a core network device. The core network device includes, for example, a network device that processes and forwards signaling and data of a user. In a 4G system, a core network device is, for example, a mobility management entity (mobility management entity, MME). The MME is a key control node of an access network of an LTE system defined in the 3rd generation partnership project (3rd generation partnership project, 3GPP) protocol. The MME is responsible for a positioning and paging process and the like of a terminal device in an idle mode, where relaying is included. Briefly, the MME is a core network device responsible for signaling processing. Alternatively, in a 5G system, the core network device includes, for example, a core network device such as an access management network element, a session management network element, or a user plane gateway. The user plane gateway may be a server that has functions such as mobility management, routing, and forwarding specific to user plane data. The user plane gateway, for example, a serving gateway (serving gateway, SGW), a packet data network gateway (packet data network gateway, PGW), or a user plane network element functional entity (user plane function, UPF), is generally located on a network side.

The following further describes a HARQ transmission method in embodiments of this application in detail with reference to the accompanying drawings.

Figure 5:
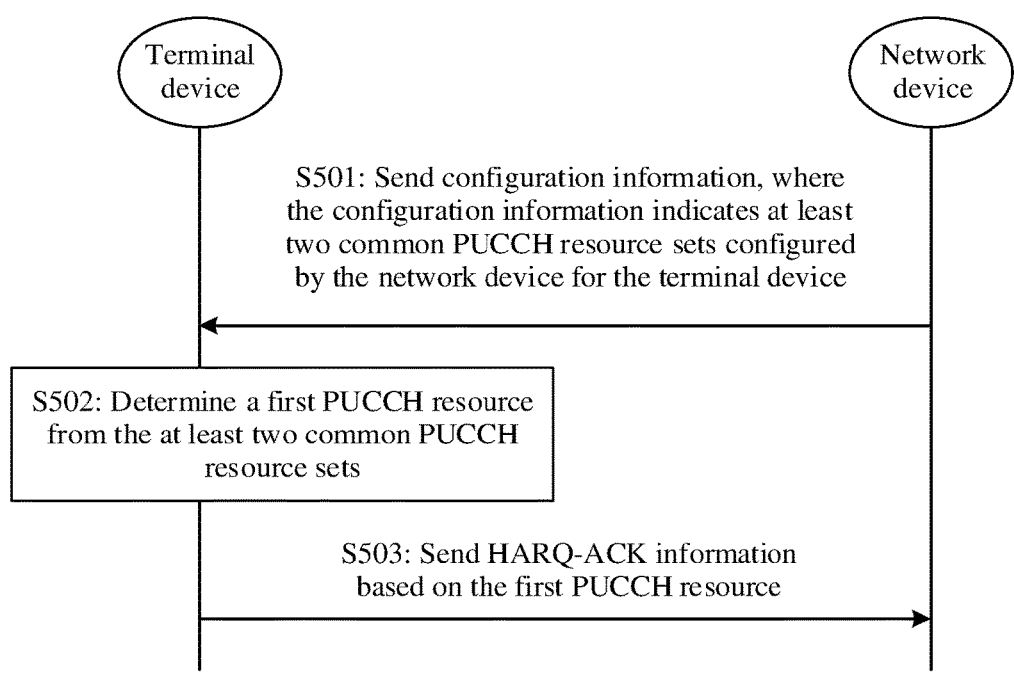
FIG. 5 is a flowchart of a HARQ transmission method according to an embodiment of this application.

FIG. 5 is a flowchart of a HARQ transmission method according to an embodiment of this application. The method may be applied to the communication system shown in FIG. 4, and the method includes the following steps.

S501: A network device sends configuration information to a terminal device, and the terminal device receives the configuration information from the network device, where the configuration information indicates at least two common PUCCH resource sets configured by the network device for the terminal device.

In this embodiment of this application, any two PUCCH resources in the at least two common PUCCH resource sets configured by the network device for the terminal device are orthogonal in frequency domain. To be specific, different PUCCH resources in a same common PUCCH resource set are orthogonal in frequency domain, and any two PUCCH resources in different common PUCCH resource sets are orthogonal in frequency domain. In this way, a collision between PUCCH resources determined by different terminal devices can be avoided, and a possibility of successfully sending a HARQ-ACK can be improved.

Table 1 is used as an example. It is assumed that all common PUCCH resource sets available to a network are listed in Table 1. According to a PUCCH resource mapping rule, any two PUCCH resources in common PUCCH resource sets whose indexes are 1 and 2 are orthogonal in frequency domain, any two PUCCH resources in common PUCCH resource sets whose indexes are 4, 5, and 6 are orthogonal in frequency domain, any two PUCCH resources in common PUCCH resource sets whose indexes are 8, 9, and 10 are orthogonal in frequency domain, and any two PUCCH resources in common PUCCH resource sets whose indexes are 12, 13, and 14 are orthogonal in frequency domain. Correspondingly, the network device may configure two common PUCCH resource sets for the terminal device based on Table 1, for example, the common PUCCH resource sets whose indexes are 1 and 2, the common PUCCH resource sets whose indexes are 4 and 5, or the common PUCCH resource sets whose indexes are 9 and 10. The network device may alternatively configure three common PUCCH resource sets for the terminal device based on Table 1, for example, the common PUCCH resource sets whose indexes are 4, 5 and 6, or the common PUCCH resource sets whose indexes are 8, 9 and 10.

It should be understood that the foregoing is merely an example but not a limitation. In a specific implementation, the common PUCCH resource sets available to the network are not limited to the common PUCCH resource sets shown in Table 1, and the common PUCCH resource sets configured by the network device for the terminal device are not limited to the common PUCCH resource sets listed above.

Optionally, the network device may configure the at least two common PUCCH resource sets for the terminal device by using broadcast information.

S502: The terminal device determines a first PUCCH resource from the at least two common PUCCH resource sets.

It should be understood that the first PUCCH resource herein is a PUCCH frequency domain resource. For ease of description, in the following, the PUCCH frequency domain resource may also be referred to as a PUCCH resource for short. Unless otherwise specified, the PUCCH resource in this application is a PUCCH frequency domain resource.

S503: The terminal device sends HARQ-ACK information to the network device based on the first PUCCH resource.

It should be understood that the HARQ-ACK information in S503 may be the HARQ-ACK information used to reflect the status of receiving the Msg4 in the scenario shown in FIG. 1, may be the HARQ-ACK information used to reflect the status of receiving the Msg4 in the scenario shown in FIG. 3A, or may be the HARQ-ACK information used to reflect the status of receiving the MsgB in the scenario shown in FIG. 3B. Certainly, the HARQ-ACK information may alternatively be HARQ-ACK information used to reflect a status of receiving other data or signals. This is not limited in embodiments of this application.

In this embodiment of this application, the network device may indicate the first PUCCH resource to the terminal device in a plurality of manners. Correspondingly, the terminal device may also determine the first PUCCH resource from the at least two common PUCCH resource sets in a plurality of manners.

The following lists three possible manners thereof.

Manner 1: (After S501 and before S502) The network device sends a first PRI to the terminal device, where the first PRI indicates the first PUCCH resource in the at least two common PUCCH resource sets.

Correspondingly, the terminal device determines the first PUCCH resource from the at least two common PUCCH resource sets based on the first PRI from the network device.

Specifically, the first PRI indicates a resource location of the first PUCCH resource in the at least two common PUCCH resource sets. Therefore, the terminal device may directly determine the first PUCCH resource from the at least two common PUCCH resource sets based on the first PRI.

Optionally, a value of the first PRI is an integer greater than or equal to 0 and less than a first preset value, and the first preset value is a quantity of PUCCH resources in the at least two common PUCCH resource sets. To be specific, a quantity of possible values of the first PRI is the same as the quantity of PUCCH resources in the at least two common PUCCH resource sets, to ensure that each possible value of the first PRI corresponds to a unique PUCCH resource in the at least two common PUCCH resource sets.

Optionally, different common PUCCH resource sets in the at least two common PUCCH resource sets correspond to different value ranges of the first PRI. Correspondingly, the terminal device may first determine a value range within which the value of the first PRI falls, then determines, from the at least two common PUCCH resource sets, a common PUCCH resource set corresponding to the value range within which the value of the first PRI falls, and finally determines, based on the value of the first PRI, the first PUCCH resource from the common PUCCH resource set corresponding to the value range within which the value of the first PRI falls.

In this embodiment of this application, there may be a plurality of value ranges of the first PRI, for example, two, three, or four value ranges. A specific quantity of value ranges is not limited in this embodiment of this application.

Optionally, indexes of the at least two common PUCCH resource sets are consecutive or inconsecutive.

Optionally, the quantity of value ranges of the first PRI is the same as a quantity of the at least two common PUCCH resource sets.

For example, the network device configures two common PUCCH resource sets for the terminal device. In this case, the first PRI has two value ranges: a first value range and a second value range. If the value of the first PRI falls within the first value range, the value of the first PRI is an index of the first PUCCH resource in a first common PUCCH resource set. If the value of the first PRI falls within the second value range, the value of the first PRI minus a second preset value is an index of the first PUCCH resource in a second common PUCCH resource set. If indexes of the two common PUCCH resource sets are consecutive, the second preset value is equal to a total quantity of resources in the first common PUCCH resource set.

Optionally, when the network device configures the at least two common PUCCH resource sets for the terminal device, the network device may indicate an index of any one of the at least two common PUCCH resource sets to the terminal device. The terminal device determines another common PUCCH resource set in the at least two common PUCCH resource sets based on the index of any common PUCCH resource set and according to a preset rule.

For example, the network device configures the two common PUCCH resource sets for the terminal device. The network device may indicate an index of the first common PUCCH resource set to the terminal device. The terminal device obtains an index of the second common PUCCH resource set by increasing the index of the first common PUCCH resource set by a third preset value. Alternatively, the network device may indicate an index of the second common PUCCH resource set to the terminal device. The terminal device obtains an index of the first common PUCCH resource set by subtracting a third preset value from the index of the second common PUCCH resource set. The third preset value is a positive integer. Optionally, when the index of the first common PUCCH resource set and the index of the second common PUCCH resource set are consecutive, the third preset value is 1.

The following describes examples of Manner 1 with reference to Table 1.

Example 1: The network device configures the first common PUCCH resource set and the second common PUCCH resource set for the terminal device, the index of the first common PUCCH resource set and the index of the second common PUCCH resource set are consecutive, and the first common PUCCH resource set and the second common PUCCH resource set include a total of 32 PUCCH frequency domain resources.

First, the network device configures a value of "PUCCH-ResourceCommon" signaling as the index of the first common PUCCH resource set, and sends "PUCCH-Resource-Common" to the terminal device. The terminal device determines, based on "PUCCH-ResourceCommon", that the two common PUCCH resource sets configured by the network device for the terminal device are the first common PUCCH resource set whose index is "PUCCH-Resource-Common" and the second common PUCCH resource set whose index is "PUCCH-ResourceCommon"+1. Based on Table 1, the value of "PUCCH-ResourceCommon" may be 1, 4, 8, 12, 5, 9, 13, or the like.

Certainly, the network device may alternatively configure a value of "PUCCH-ResourceCommon" signaling as the index of the second common PUCCH resource set, and send "PUCCH-ResourceCommon" to the terminal device. Correspondingly, the terminal device determines, based on "PUCCH-ResourceCommon", that the two common PUCCH resource sets configured by the network device for the terminal device are the second common PUCCH resource set whose index is "PUCCH-ResourceCommon" and the first common PUCCH resource set whose index is "PUCCH-ResourceCommon"-1.

The terminal device receives the first PRI from the network device. If an index of a PUCCH frequency domain resource indicated by the first PRI is less than 16, the terminal device determines that an index of a used common PUCCH resource set remains unchanged, that is, the first common PUCCH resource set indicated by the network device by using "PUCCH-ResourceCommon" is used. If an index of a PUCCH frequency domain resource indicated by the first PRI is greater than or equal to 16 and less than 32, the terminal device determines that a used common PUCCH resource set is the second common PUCCH resource set whose index is "PUCCH-ResourceCommon"+1.

A method for mapping the first PRI to a PUCCH resource index is the same as the method described above. The foregoing describes two methods, namely, the formula (1) and the formula (2), for calculating the PUCCH resource index based on a PRI. In this embodiment, either of the methods for mapping the first PRI to the PUCCH resource index may be selected, that is, a use scenario of this embodiment is not limited. To be specific, the first PRI may be carried by using DCI or may be carried by using a PDSCH. For example, the first PRI is carried in a successRAR in a 2-step RACH.

Specifically, for example, PUCCH-ResourceCommon=1.

If an index of a PUCCH frequency domain resource that is indicated by a first PRI that is received by a terminal device 1 is 3, the terminal device 1 determines that an index of a used common PUCCH resource set is 1, and determines that a PUCCH resource (namely, a first PUCCH resource) used to send HARQ-ACK information is a third PUCCH frequency domain resource in a common PUCCH resource set 1.

If an index of a PUCCH frequency domain resource that is indicated by the first PRI and that is received by a terminal device 2 is 20, the terminal device 2 determines that an index of a used common PUCCH resource set is 2, and determines that a PUCCH resource (namely, a first PUCCH resource) used to send HARQ-ACK information is a fifth (20−15=5) PUCCH frequency domain resource in a common PUCCH resource set 2.

Example 2: The network device configures the first common PUCCH resource set, the second common PUCCH resource set, and a third common PUCCH resource set for the terminal device, indexes of the three common PUCCH resource sets are consecutive, and the three common PUCCH resource sets include a total of 48 PUCCH frequency domain resources.

First, the network device configures a value of "PUCCH-ResourceCommon" signaling as the index of the first common PUCCH resource set, and sends "PUCCH-Resource-Common" to the terminal device. The terminal device determines, based on "PUCCH-ResourceCommon", that the two common PUCCH resource sets configured by the network device for the terminal device are the first common PUCCH resource set whose index is "PUCCH-Resource-Common", the second common PUCCH resource set whose index is "PUCCH-ResourceCommon"+1, and the third common PUCCH resource set whose index is "PUCCH-Re-sourceCommon"+2. Based on Table 1, a value of "PUCCH-ResourceCommon" may be 4, 8, or 12.

Alternatively, the network device may configure a value of "PUCCH-ResourceCommon" signaling as the index of the second common PUCCH resource set, and sends "PUCCH-ResourceCommon" to the terminal device. The terminal device determines, based on "PUCCH-Resource-Common", that the two common PUCCH resource sets configured by the network device for the terminal device are the second common PUCCH resource set whose index is "PUCCH-ResourceCommon", the first common PUCCH resource set whose index is "PUCCH-ResourceCommon"−1, and the third common PUCCH resource set whose index is "PUCCH-ResourceCommon"+1. Alternatively, the network device configures a value of "PUCCH-ResourceCom-mon" signaling as the index of the third common PUCCH resource set, and sends "PUCCH-ResourceCommon" to the terminal device. The terminal device determines, based on "PUCCH-ResourceCommon", that the two common PUCCH resource sets configured by the network device for the terminal device are the third common PUCCH resource set whose index is "PUCCH-ResourceCommon", the second common PUCCH resource set whose index is "PUCCH-ResourceCommon"–1, and the first common PUCCH resource set whose index is "PUCCH-ResourceCommon"–2.

The terminal device then receives the first PRI from the network device. If an index of a PUCCH frequency domain resource indicated by the first PRI is less than 16, the terminal device determines that an index of a used common PUCCH resource set remains unchanged, that is, the first common PUCCH resource set indicated by the network device by using "PUCCH-ResourceCommon" is used. If an index of a PUCCH frequency domain resource indicated by the first PRI is greater than or equal to 16 and less than 32, the terminal device determines that a used common PUCCH resource set is the second common PUCCH resource set whose index is "PUCCH-ResourceCommon"+1. If an index of a PUCCH frequency domain resource indicated by the first PRI is greater than or equal to 32 and less than 48, the terminal device determines that a used common PUCCH resource set is the third common PUCCH resource set whose index is "PUCCH-ResourceCommon"+2.

A method for mapping the first PRI to a PUCCH resource index is the same as the method described above. The foregoing describes two methods, namely, the formula (1) and the formula (2), for calculating the PUCCH resource index based on a PRI. In this embodiment, either of the methods for mapping the first PRI to the PUCCH resource index may be selected, that is, a use scenario of this embodiment is not limited. To be specific, the first PRI may be carried by using DCI or may be carried by using a PDSCH. For example, the first PRI is carried in a successRAR in a 2-step RACH.

Specifically, for example, PUCCH-ResourceCommon=4.

If an index of a PUCCH frequency domain resource that is indicated by the first PRI and that is received by a terminal device 1 is 3, the terminal device 1 determines that an index of a used common PUCCH resource set is 4, and determines that a PUCCH resource (namely, a first PUCCH resource) used to send HARQ-ACK information is the third PUCCH frequency domain resource in a common PUCCH resource set 4.

If an index of a PUCCH frequency domain resource that is indicated by the first PRI and that is received by a terminal device 2 is 20, the terminal device 2 determines that an index of a used common PUCCH resource set is 5, and determines that a PUCCH resource (namely, a first PUCCH resource) used to send HARQ-ACK information is a fifth (20–15=5) PUCCH frequency domain resource in a common PUCCH resource set 5.

If an index of a PUCCH frequency domain resource that is indicated by the first PRI and that is received by a terminal device 3 is 35, the terminal device 3 determines that an index of a used common PUCCH resource set is 6, and determines that a PUCCH resource (namely, a first PUCCH resource) used to send HARQ-ACK information is a fourth (35–31=4) PUCCH frequency domain resource in a common PUCCH resource set 6.

It should be noted that, in this embodiment of this application, a solution in which the first PRI is carried by using the DCI or the PDSCH is not limited to being applied to a 4-step RACH or 2-step RACH scenario, and this solution is applicable to any other scenarios in which the common PUCCH resource set needs to be used for uplink transmission, for example, a scenario of a HARQ feedback or CSI.

In the foregoing Manner 1, the first PRI indicates the common PUCCH resource set used by the terminal device, so that an available common PUCCH resource set can be dynamically indicated and adjusted. In addition, no more configuration signaling needs to be added to indicate the common PUCCH resource set used by the terminal device, so that system overheads can be reduced.

Manner 2: (After S501 and before S502) The network device sends a common PUCCH resource set indicator and a second PRI to the terminal device.

The common PUCCH resource set indicator indicates a common PUCCH resource set (for example, the first common PUCCH resource set, where the first common PUCCH resource set may be any one of the at least two common PUCCH resource sets) used by the terminal device.

The second PRI indicates a resource location of a PUCCH resource, namely, the first PUCCH resource, used by the terminal device in the first common PUCCH resource set. For example, an index indicated by the second PRI may be an index of the first PUCCH resource in the first common PUCCH resource set. For a method for mapping the second PRI to a PUCCH resource index, refer to the method described above, for example, the formula (1) or the formula (2). Details are not described herein again.

Correspondingly, the terminal device determines, based on the common PUCCH resource set indicator from the network device, the common PUCCH resource set, namely, the first common PUCCH resource set, used by the terminal device from the at least two common PUCCH resource sets. Then the terminal device determines, based on the second PRI from the network device, the first PUCCH resource from the first common PUCCH resource set.

Optionally, the common PUCCH resource set indicator may be carried in DCI or a PDSCH.

Figure 6:
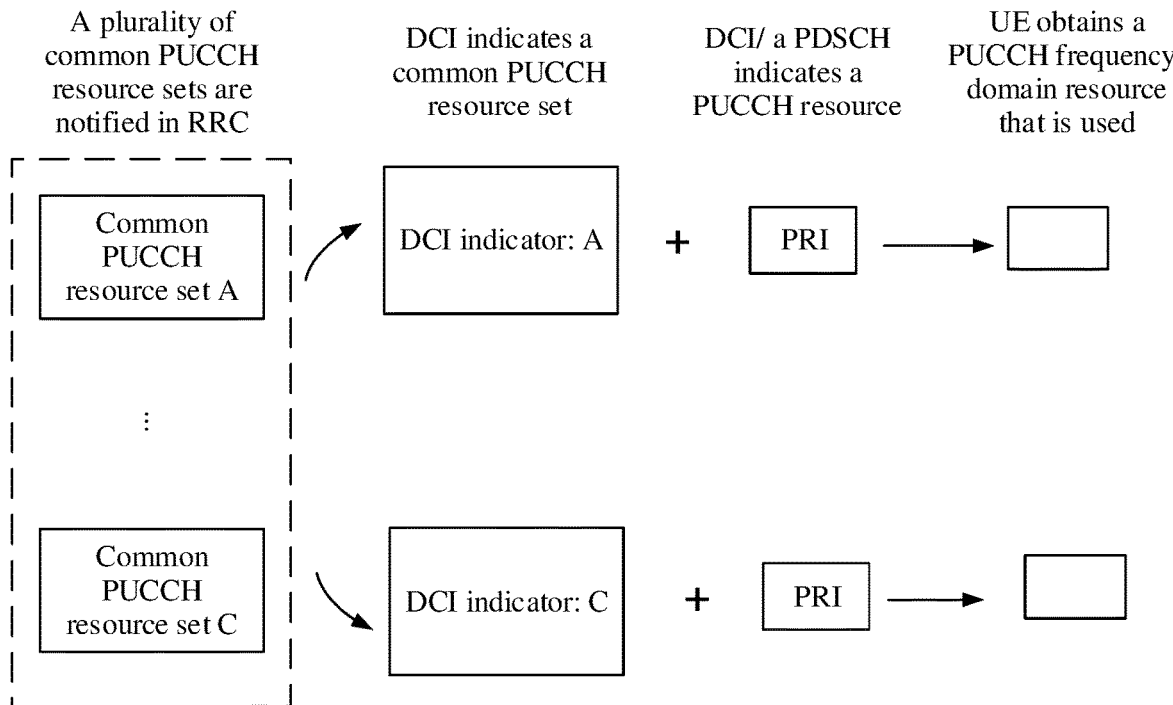
FIG. 6 is a schematic diagram in which a terminal device determines a PUCCH resource from a plurality of common PUCCH resource sets.

FIG. 6 is a schematic diagram in which the terminal device determines a PUCCH resource from a plurality of common PUCCH resource sets. Specific steps may include:

(1) The network device configures a plurality of common PUCCH resource set indexes by using broadcast information.

For example, two common PUCCH resource set indexes are configured. The network device may include the index of the first common PUCCH resource set (for example, a common PUCCH resource set A in FIG. 6) and the index of the second common PUCCH resource set (for example, a common PUCCH resource set B in FIG. 6) in a common PUCCH configuration information element (PUCCH-ConfigCommon information element).

Further, the PUCCH-ConfigCommon information element further carries a first uplink data generation configuration parameter corresponding to the first common PUCCH resource set.

Optionally, the PUCCH-ConfigCommon information element further carries a second uplink data generation configuration parameter corresponding to the second common PUCCH resource set. When performing uplink transmission by using the first common PUCCH resource set, the terminal device generates uplink data by using the first uplink data generation configuration parameter. When performing uplink transmission by using the second common PUCCH resource set, the terminal device generates uplink data by using the second uplink data generation configuration parameter. That is, the first common PUCCH resource set and the second common PUCCH resource set separately use different uplink data generation configuration parameters.

Alternatively, the PUCCH-ConfigCommon information element does not carry an uplink data generation configuration parameter corresponding to the second common PUCCH resource set. When performing uplink transmission by using the first common PUCCH resource set, the terminal device generates uplink data by using the first uplink data generation configuration parameter. When performing uplink transmission by using the second common PUCCH resource set, the terminal device also generates uplink data by using the first uplink data generation configuration parameter. That is, the first common PUCCH resource set and the second common PUCCH resource set share a set of uplink data generation configuration parameters.

(2) The network device includes a common PUCCH resource set indicator in DCI signaling.

A 2-step RACH process is used as an example herein.

Specifically, the following information is transmitted in DCI format 1_0, where a cyclic redundancy check (cyclic redundancy check, CRC) is scrambled by using a radio network temporary identifier (radio network temporary identity, RNTI) of a MsgB:

A. Frequency domain resource assignment:

$$\lceil \log_2(N_{RB}^{DL,BWP}(N_{RB}^{DL,BWP}+1)/2)\rceil$$

bits, where
if a cell is configured with CORESET 0, $$N_{RB}^{DL,BWP}$$

is a size of CORESET 0; or if a cell is not configured with CORESET 0, $$N_{RB}^{DL,BWP}$$

is a size of an initial downlink bandwidth part;
B. Time domain resource assignment: 4 bits as defined in Subclause 5.1.2.1 of [6, TS38.214];
C. VRB-to-PRB mapping: 1 bit according to Table 7.3.1.1.2-33;
D. Modulation and coding scheme: 5 bits 4 bits as defined in Subclause 5.1.3 of [6, TS 38.214], using Table 5.1.3.1-1;
E. TB scaling: 2 bits as defined in Subclause 5.1.3.2 of [6, TS38.214];
F. Common PUCCH resource set indicator (Common PUCCH resource set indicator): X bits; and
G. Reserved bits: (16-X) bits, where "—" indicates subtraction.

DCI format 1_0 is used to schedule a PDSCH on which a response message is located in the 2-step RACH process, and the PDSCH carries a successRAR sent to the terminal device. After the terminal device successfully decodes the successRAR and determines that contention resolution succeeds, the terminal device determines, based on the common PUCCH resource set indicator in the DCI, a PUCCH resource set available to the terminal device, and then determines, based on a PRI in PUCCH resource information (including the PRI and PDSCH to HARQ-ACK feedback timing) in the successRAR, a PUCCH resource to be used.

A specific implementation form of the common PUCCH resource set indicator is not limited in this embodiment.

For example, the common PUCCH resource set indicator is implemented in a method shown in Table 2.

TABLE 2

| Common PUCCH resource set indicator | |
| --- | --- |
| Common PUCCH resource set indicator | Indicates a common PUCCH resource set index set {1, 2} configured by using broadcast information |
| 0 | Indicates the first index in the common PUCCH resource set index set: 1 |
| 1 | Indicates the second index in the common PUCCH resource set index set: 2 |

It should be understood that Table 2 is merely used to describe a method for mapping a common PUCCH resource set indicator to a PUCCH resource set, and is not intended to limit a bit length of the common PUCCH resource set indicator.

In addition, the common PUCCH resource set indicator is not limited to being carried in the DCI format shown in this embodiment of the present invention, and the common PUCCH resource set indicator may be carried in another DCI format for scheduling PUCCH resources. For example, in a 4-step RACH process, a DCI format in which a base station sends a Msg4 may also carry a common PUCCH resource set indicator.

Optionally, the common PUCCH resource set indicator may be carried in the DCI, and the PUCCH resource information is carried in the PDSCH.

Optionally, common PUCCH resource set indication information and the PUCCH resource information (including the second PRI and the PDSCH to HARQ-ACK feedback timing) may be located on a same channel. For example, both the common PUCCH resource set indicator and the PUCCH resource information are located in the DCI, or both the common PUCCH resource set indication and the PUCCH resource information are located in the PDSCH.

It should be noted that, in this embodiment of this application, a solution in which the common PUCCH resource set indicator indicates the common PUCCH resource set used by the terminal device is not limited to being applied to a 2-step RACH scenario, and this solution is applicable to a 4-step RACH scenario or any other scenarios in which the PUCCH resource in the common PUCCH resource set needs to be used for uplink transmission, for example, a scenario of a HARQ feedback or CSI.

In the foregoing Manner 2, the common PUCCH resource set indicator indicates the common PUCCH resource set used by the terminal device, so that an implementation is simple, and an available common PUCCH resource set can be dynamically indicated and adjusted.

Manner 3: The network device associates the at least two common PUCCH resource sets configured for the terminal device with at least two uplink transmission resource configurations, and sends a second PRI to the terminal device.

The second PRI indicates a resource location of the first PUCCH resource in a common PUCCH resource set (for example, a first common PUCCH resource set) used by the terminal device, for example, an index of the first PUCCH resource in the first common PUCCH resource set. For a method for mapping the second PRI to a PUCCH resource index, refer to the method described above, for example, the formula (1) or the formula (2). Details are not described herein again.

Correspondingly, the terminal device determines a first uplink transmission resource configuration used by the terminal device in an uplink transmission process, determines that the used common PUCCH resource set is a common PUCCH resource set (namely, the first common PUCCH resource set) associated with the first uplink transmission resource configuration, and determines, based on the second PRI from the network device, that a used PUCCH resource is the first PUCCH resource in the first common PUCCH resource set.

In this embodiment of this application, the at least two common PUCCH resource sets may be associated with the at least two uplink transmission resource configurations in a plurality of manners.

In a possible manner, the common PUCCH resource sets in the at least two common PUCCH resource sets are in one-to-one correspondence with uplink transmission resource configurations in the at least two uplink transmission resource configurations. In other words, a unique uplink transmission resource configuration may be determined by using one common PUCCH resource set, and on the contrary, a unique common PUCCH resource set may be determined by using one uplink transmission resource configuration.

In another possible manner, each of the at least two common PUCCH resource sets is associated with one or more of the at least two uplink transmission resource configurations, and each uplink transmission resource configuration is associated with only one common PUCCH resource set. In other words, one or more uplink transmission resource configurations may be determined by using one common PUCCH resource set, but a unique common PUCCH resource set may be determined by using one uplink transmission resource configuration.

Optionally, the uplink transmission resource configuration includes one or more of a PUSCH resource, a preamble (preamble) set (or a preamble group), a physical random access channel (physical random access channel, PRACH), or a coverage enhancement level.

The following uses a PUSCH time-frequency resource configuration in a 2-step RACH as an example.

Figure 7:
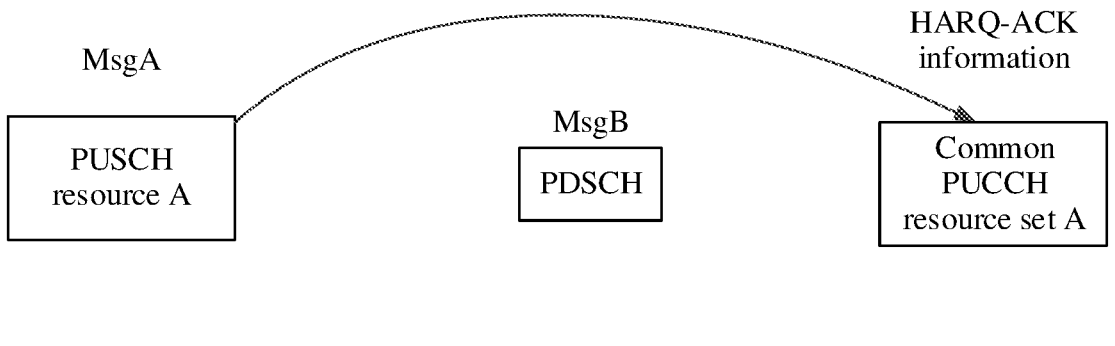
FIG. 7 is a schematic diagram in which a common PUCCH resource set is associated with a PUSCH time-frequency resource configuration.
Figure 7:
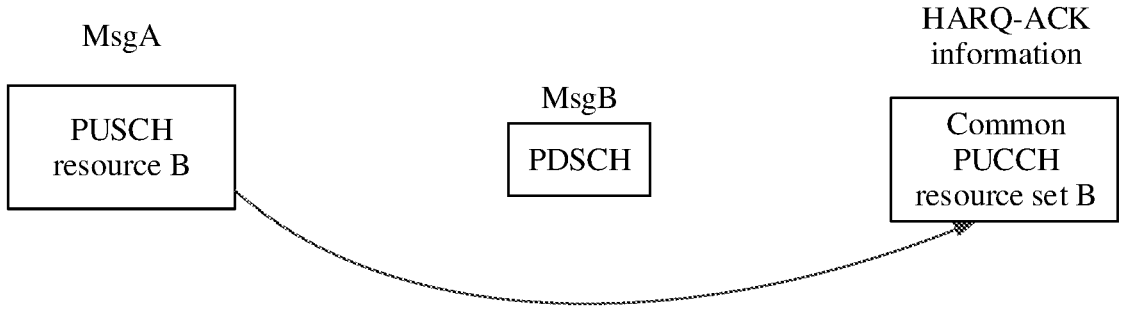

In a configuration of the 2-step RACH, each terminal device may have a plurality of PUSCH time-frequency resource configurations. Refer to FIG. 7. A PUSCH resource A and a PUSCH resource B are used as an example.

Further, each PUSCH time-frequency resource configuration may be associated with one common PUCCH resource set. As shown in FIG. 7, the PUSCH resource A is associated with a common PUCCH resource set A, and the PUSCH resource B is associated with a common PUCCH resource set B.

When a PUSCH time-frequency resource configuration that is used by the terminal device for MsgA transmission in the 2-step RACH is the PUSCH resource A, the terminal device may determine, based on the PUSCH resource A, that a common PUCCH resource set used for a HARQ feedback is the common PUCCH resource set A. The terminal device then determines, from the common PUCCH resource set A based on a second PRI carried in DCI for scheduling contention resolution information or carried in a response message successRAR, a used PUCCH frequency domain resource.

When a PUSCH time-frequency resource configuration that is used by the terminal device for MsgA transmission in the 2-step RACH is the PUSCH resource B, the terminal device may determine, based on the PUSCH resource B, that a common PUCCH resource set used for a HARQ feedback is the common PUCCH resource set B. The terminal device then determines, from the common PUCCH resource set B based on a second PRI carried in DCI for scheduling contention resolution information or carried in a response message successRAR, a used PUCCH frequency domain resource.

Optionally, each PUSCH time-frequency resource configuration may be associated with one common PUCCH resource set in a plurality of manners.

Example 1: PUSCH time-frequency resource configuration information includes a common PUCCH resource set index.

Specifically, each piece of PUSCH time-frequency resource configuration information includes one common PUCCH resource set index. For example, the common PUCCH resource set index may correspond to one of the available common PUCCH resource sets listed in Table 1. The terminal device determines a used common PUCCH resource set based on the common PUCCH resource set index included in the PUSCH time-frequency resource configuration information.

Example 2: PUSCH time-frequency resource configuration information includes a common PUCCH resource set indicator.

If the network device configures a plurality of common PUCCH resource set index sets for the terminal device, each piece of PUSCH time-frequency resource configuration information may include one common PUCCH resource set indicator, and the terminal device determines, based on the common PUCCH resource set indicator, a used common PUCCH resource set from the plurality of common PUCCH resource set index sets configured by the network device for the terminal device.

For example, the network device configures a common PUCCH resource set index set {4, 5, 6} for the terminal device by using broadcast information. In this case, a correspondence between a value of the common PUCCH resource set indicator in the PUSCH time-frequency resource configuration information and the common PUCCH resource set used by the terminal device may be shown in Table 3.

TABLE 3

| Common PUCCH resource set indicator in PUSCH time-frequency resource configuration information | Index of a common PUCCH resource set used by a terminal device |
|---|---|
| 00 | Indicates the first index in the common PUCCH resource set index set {4, 5, 6}: 4 |
| 01 | Indicates the second index in the common PUCCH resource set index set {4, 5, 6}: 5 |
| 10 | Indicates the third index in the common PUCCH resource set index set {4, 5, 6}: 6 |

Optionally, the PUSCH time-frequency resource configuration information may further include the following content: configuration information of a PUSCH time domain offset (msgAPUSCH-timeDomainOffset), configuration information of a PUSCH occasion (Occasion) start symbol and a time domain length (startSymbolAndLength-MsgAPO), configuration information of a PUSCH time domain guard period (guardPeriodMsgAPUSCH), configuration information of a number of slots (nrofSlotsMsgA-PUSCH) including PUSCH time-frequency resources, and configuration information of a number of PUSCH occasion time domain resources (nrofMsgAPOperSlot) in one slot.

The configuration information of the PUSCH time domain offset is used to configure a time domain offset offset of the first slot including a PUSCH occasion relative to a start position of each PRACH slot. The configuration information of the PUSCH time domain guard period is used to determine a time domain interval (guard period) between PUSCH occasions in one slot. The configuration information of the number of slots including PUSCH time-frequency resources is used to configure a quantity ($N_{slots}$) of consecutive slots including PUSCH occasions. The configuration information of the number of PUSCH occasion time domain resources in one slot is used to configure a quantity of PUSCH occasion time domain resources in each slot ($N_{po}$).

Similarly, the common PUCCH resource set may be further associated with configuration information of a PRACH resource by configuration. For a specific association method, refer to the foregoing method for associating the PUSCH time-frequency resource configuration with the common PUCCH resource set. Details are not described herein again.

Similarly, the common PUCCH resource set may be further associated with configuration information of a preamble by configuration. In a random access process, a preamble configuration may include grouping information. Therefore, different preamble groups (or different preamble sets) may be associated with different common PUCCH resource sets. For a specific association method, refer to the foregoing method for associating the PUSCH time-frequency resource configuration with the common PUCCH resource set. Details are not described herein again.

Similarly, the common PUCCH resource set may be further associated with a coverage enhancement level of the terminal device by configuration. In a random access process, different terminal devices in a same cell may have different coverage enhancement levels. Therefore, different coverage enhancement levels (CE levels) may be associated with different common PUCCH resource sets. For a specific association method, refer to the foregoing method for associating the PUSCH time-frequency resource configuration with the common PUCCH resource set. Details are not described herein again.

It should be understood that the configuration of the PUSCH resource, the configuration of the preamble, the configuration of the PRACH resource, and the configuration of the coverage enhancement level are merely examples of the uplink transmission resource configuration, but are not limitations. In a specific implementation, there may be another uplink transmission resource configuration.

In the foregoing Manner 3, a common PUCCH resource set index is associated with the uplink transmission resource configuration, so that the network device configures a common PUCCH resource set to be used for the terminal device when configuring the uplink transmission resource configuration for the terminal device, so that an available common PUCCH resource set can be dynamically indicated and adjusted. In addition, no more configuration signaling needs to be added to indicate the common PUCCH resource set used by the terminal device, so that system overheads can be reduced.

It can be learned from the foregoing descriptions that in this embodiment of this application, a plurality of common PUCCH resource sets are configured for the terminal device, and more available PUCCH frequency domain resources are added in a same slot with reference to the method for dynamically indicating and adjusting a common PUCCH resource set. Therefore, a possibility of a PUCCH frequency domain resource collision can be reduced, and a transmission delay that is increased to avoid the PUCCH frequency domain resource collision can be reduced, so that random access efficiency is improved.

Optionally, in this embodiment of this application, when the terminal device performs PUCCH transmission, to improve PUCCH transmission reliability, the terminal device may further set a quantity of repeated transmissions of a PUCCH.

Further, optionally, the quantity of repeated transmissions of the PUCCH may be configured by using user-level DCI. For example, in a 4-step RACH process or a 2-step RACH process, when a user receives a Msg4, DCI for scheduling a PDSCH in the Msg4 may carry a quantity of repeated transmissions of a PUCCH, and the DCI also carries resource indication information (including a PRI and a PDSCH-to-HARQ feedback timing indicator) of the PUCCH. Alternatively, in a 2-step RACH process, successRAR information may include a quantity of repeated transmissions of a PUCCH. Alternatively, a quantity of repeated transmissions of a PUCCH may be the same as a quantity of repeated transmissions of a PUSCH in a MsgA.

The implementations of embodiments of this application may be combined with each other to achieve different technical effects.

The foregoing describes in detail the method provided in embodiments of this application with reference to FIG. 5 to FIG. 7. The following describes in detail apparatuses provided in embodiments of this application with reference to FIG. 8 to FIG. 11.

Based on a same technical concept, an embodiment of this application provides a communication apparatus 800. The apparatus 800 may be, for example, a terminal device or a chip in a terminal device. The apparatus 800 has a function of implementing the terminal device in embodiments shown in FIG. 5 to FIG. 7. For example, the apparatus 800 includes a corresponding module, unit, or means (means) for performing the steps performed by the terminal device in embodiments shown in FIG. 5 to FIG. 7. The function, the unit, or the means may be implemented by software, may be implemented by hardware, or may be implemented by hardware executing corresponding software.

Figure 8:
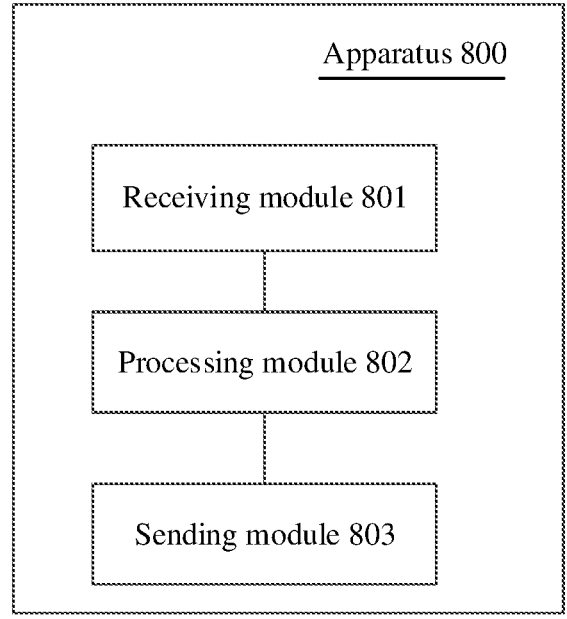
FIG. 8 is a schematic diagram of a structure of a communication apparatus 800 according to an embodiment of this application.

For example, refer to FIG. 8. The apparatus 800 may include:

a receiving module 801, configured to receive configuration information from a network device, where the configuration information indicates at least two common PUCCH resource sets configured by the network device for the apparatus 800;

a processing module 802, configured to determine a first PUCCH resource from the at least two common PUCCH resource sets; and a sending module 803, configured to send HARQ-ACK information to the network device based on the first PUCCH resource.

In a possible design, the processing module 802 is specifically configured to:

determine the first PUCCH resource from the at least two common PUCCH resource sets based on a first PRI from the network device, where the first PRI is used to determine a resource location of the first PUCCH resource in the at least two common PUCCH resource sets, a value of the first PRI is an integer greater than or equal to 0 and less than a first preset value, and the first preset value is a total quantity of PUCCH resources in the at least two common PUCCH resource sets.

In a possible design, the processing module 802 is specifically configured to:

determine a value range within which the value of the first PRI falls, and determine, from the at least two common PUCCH resource sets, a common PUCCH resource set corresponding to the value range within which the value of the first PRI falls, where different common PUCCH resource sets in the at least two common PUCCH resource sets correspond to different value ranges; and determine, based on the value of the first PRI, the first PUCCH resource from the common PUCCH resource set corresponding to the value range within which the value of the first PRI falls.

In a possible design, if the value of the first PRI falls within a first value range, the value of the first PRI is an index of the first PUCCH resource in a first common PUCCH resource set; or if the value of the first PRI falls within a second value range, the value of the first PRI minus a second preset value is an index of the first PUCCH resource in a second common PUCCH resource set.

In a possible design, an index of the first common PUCCH resource set plus a third preset value is an index of the second common PUCCH resource set.

In a possible design, the processing module 802 is specifically configured to:

determine a first common PUCCH resource set from the at least two common PUCCH resource sets; and determine the first PUCCH resource from the first common PUCCH resource set based on a second PRI from the network device, where the second PRI indicates a resource location of the first PUCCH resource in the first common PUCCH resource set.

In a possible design, when determining the first common PUCCH resource set from the at least two common PUCCH resource sets, the processing module 802 is specifically configured to:

determine the first common PUCCH resource set from the at least two common PUCCH resource sets based on a common PUCCH resource set indicator from the network device, where the common PUCCH resource set indicator indicates the first common PUCCH resource set in the at least two common PUCCH resource sets.

In a possible design, the at least two common PUCCH resource sets are associated with at least two uplink transmission resource configurations.

When determining the first common PUCCH resource set from the at least two common PUCCH resource sets, the processing module 802 is specifically configured to:

determine a first uplink transmission resource configuration used by the apparatus 800 in an uplink transmission process, and determine a common PUCCH resource set associated with the first uplink transmission resource configuration as the first common PUCCH resource set.

In a possible design, the uplink transmission resource configuration includes one or more of a PUSCH resource, a preamble set, a physical random access channel PRACH resource, or a coverage enhancement level.

In a possible design, any two PUCCH resources in the at least two common PUCCH resource sets are orthogonal in frequency domain.

It should be understood that all related content of the steps in the foregoing method embodiments may be cited in function descriptions of the corresponding functional modules. Details are not described herein again.

Based on a same technical concept, an embodiment of this application provides a communication apparatus 900. The apparatus 900 may be, for example, a network device or a chip in a network device. The apparatus 900 has a function of implementing the network device in embodiments shown in FIG. 5 to FIG. 7. For example, the apparatus 900 includes a corresponding module, unit, or means (means) for performing the steps performed by the network device in embodiments shown in FIG. 5 to FIG. 7. The function, the unit, or the means may be implemented by software, may be implemented by hardware, or may be implemented by hardware executing corresponding software.

Figure 9:
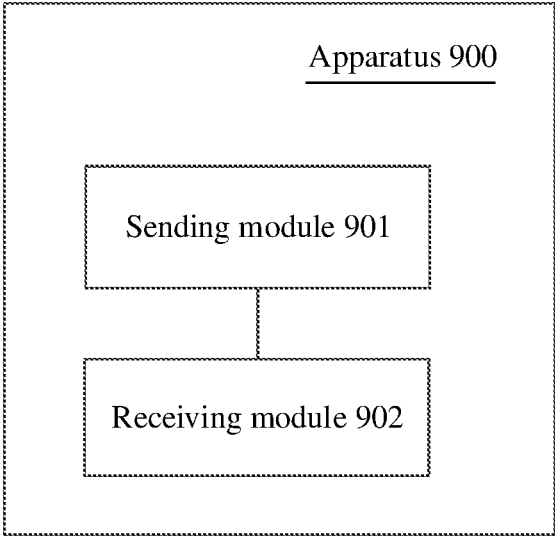
FIG. 9 is a schematic diagram of a structure of another communication apparatus 900 according to an embodiment of this application.

For example, refer to FIG. 9. The apparatus 900 may include:

a sending module 901, configured to send configuration information to a terminal device, where the configuration information indicates at least two common PUCCH resource sets configured by the apparatus 900 for the terminal device; and a receiving module 902, configured to receive HARQ-ACK information from the terminal device, where the HARQ-ACK information is sent by the terminal device based on a first PUCCH resource in the at least two common PUCCH resource sets.

In a possible design, the sending module 901 is further configured to:

send a first PRI to the terminal device, where the first PRI is used to determine a resource location of the first PUCCH resource in the at least two common PUCCH resource sets, a value of the first PRI is an integer greater than or equal to 0 and less than a first preset value, and the first preset value is a total quantity of PUCCH resources in the at least two common PUCCH resource sets.

In a possible design, a value range within which the value of the first PRI falls corresponds to one of the at least two common PUCCH resource sets, and different common PUCCH resource sets in the at least two common PUCCH resource sets correspond to different value ranges.

In a possible design, if the value of the first PRI falls within a first value range, the value of the first PRI is an index of the first PUCCH resource in a first common PUCCH resource set; or if the value of the first PRI falls within a second value range, the value of the first PRI minus a second preset value is an index of the first PUCCH resource in a second common PUCCH resource set.

In a possible design, an index of the first common PUCCH resource set plus a third preset value is an index of the second common PUCCH resource set.

In a possible design, the sending module 901 is further configured to:

send a second PRI to the terminal device, where the second PRI indicates a resource location of the first PUCCH resource in a first common PUCCH resource set.

In a possible design, the sending module 901 is further configured to:

send a common PUCCH resource set indicator to the terminal device, where the common PUCCH resource set indicator indicates the first common PUCCH resource set in the at least two common PUCCH resource sets.

In a possible design, the at least two common PUCCH resource sets are associated with at least two uplink transmission resource configurations.

the first common PUCCH resource set is associated with a first uplink transmission resource configuration used by the terminal device in an uplink transmission process.

In a possible design, the uplink transmission resource configuration includes one or more of a PUSCH resource, a preamble set, a physical random access channel PRACH resource, or a coverage enhancement level.

In a possible design, any two PUCCH resources in the at least two common PUCCH resource sets are orthogonal in frequency domain.

It should be understood that all related content of the steps in the foregoing method embodiments may be cited in function descriptions of the corresponding functional modules. Details are not described herein again.

Figure 10:
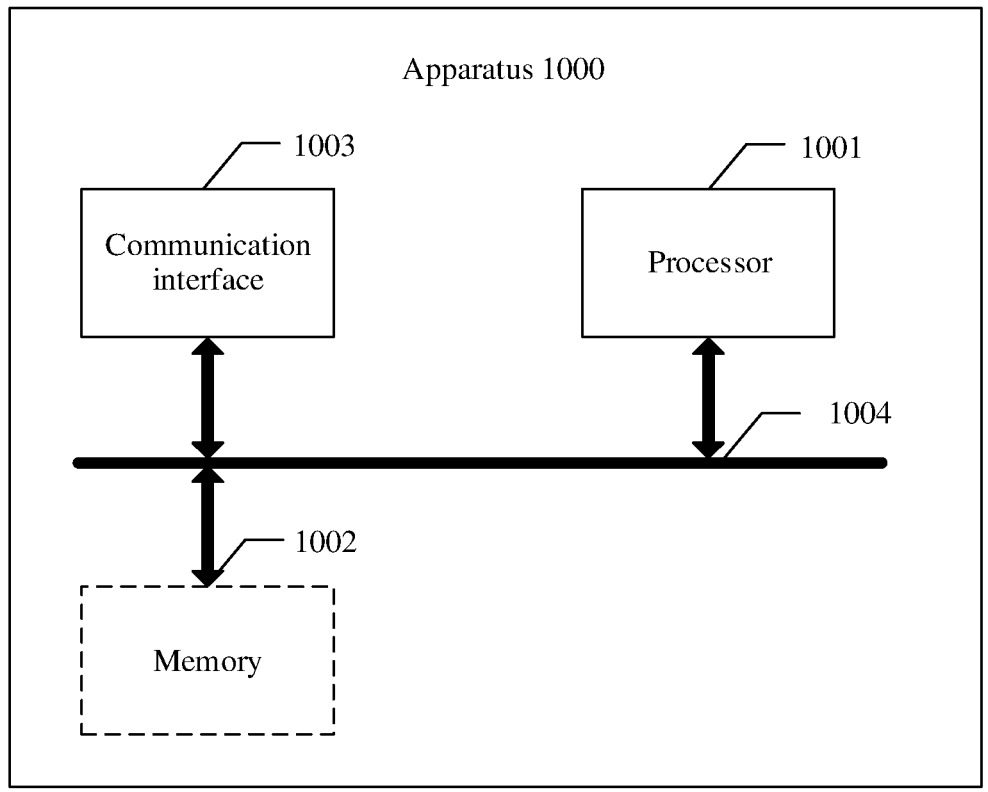
FIG. 10 is a schematic diagram of a structure of another communication apparatus 1000 according to an embodiment of this application.

Based on a same technical concept, as shown in FIG. 10, an embodiment of this application further provides a communication apparatus 1000. The communication apparatus 1000 includes:

at least one processor 1001 and a communication interface 1003 that are communicatively connected to the at least one processor 1001. The at least one processor 1001 executes instructions stored in a memory 1002, so that the apparatus performs the method steps performed by the terminal device in embodiments shown in FIG. 5 to FIG. 7.

Optionally, the memory 1002 is located outside the apparatus 1000.

Optionally, the apparatus 1000 includes the memory 1002. The memory 1002 is connected to the at least one processor 1001, and the memory 1002 stores the instruction that can be executed by the at least one processor 1001.

Optionally, the memory 1002 is located outside the apparatus 1000.

Optionally, the apparatus 1000 includes the memory 1002. The memory 1002 is connected to the at least one processor 1001, and the memory 1002 stores the instruction that can be executed by the at least one processor 1001. In FIG. 10, a dashed line indicates that the memory 1002 is optional for the apparatus 1000.

The processor 1001 and the memory 1002 may be coupled through an interface circuit, or may be integrated together. This is not limited herein.

A specific connection medium between the processor 1001, the memory 1002, and the communication interface 1003 is not limited in this embodiment of this application. In this embodiment of this application, the processor 1001, the memory 1002, and the communication interface 1003 are connected through a bus 1004 in FIG. 10. The bus is represented by a bold line in FIG. 10. The connection manner between other components is merely an example for description, and is not limited thereto. The bus may be classified into an address bus, a data bus, a control bus, and the like. For ease of representation, only one bold line is used to represent the bus in FIG. 10, but this does not mean that there is only one bus or only one type of bus.

Figure 11:
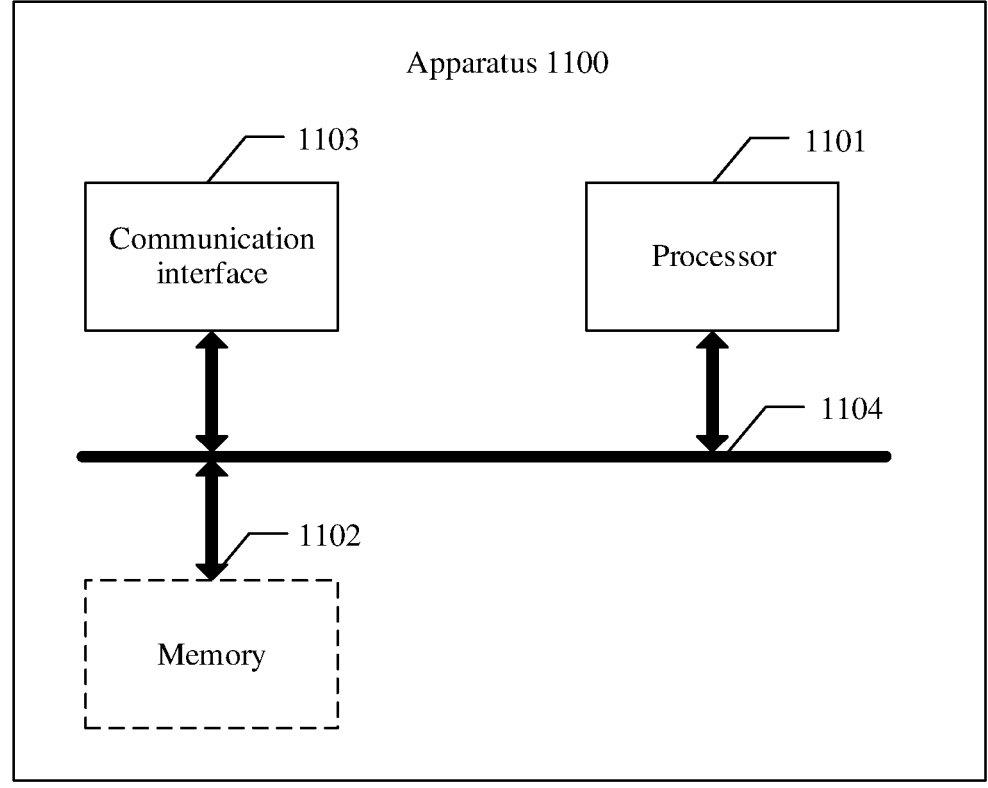
FIG. 11 is a schematic diagram of a structure of another communication apparatus 1100 according to an embodiment of this application.

Based on a same technical concept, as shown in FIG. 11, an embodiment of this application further provides a communication apparatus 1100. The communication apparatus 1100 includes:

at least one processor 1101 and a communication interface 1103 that are communicatively connected to the at least one processor 1101. The at least one processor 1101 executes instructions stored in a memory 1102, so that the apparatus performs the method steps performed by the network device in embodiments shown in FIG. 5 to FIG. 7.

Optionally, the memory 1102 is located outside the apparatus 1100.

Optionally, the apparatus 1100 includes the memory 1102, the memory 1102 is connected to the at least one processor 1101, and the memory 1102 stores instructions that can be executed by the at least one processor 1101.

Optionally, the memory 1102 is located outside the apparatus 1100.

Optionally, the apparatus 1100 includes the memory 1102, the memory 1102 is connected to the at least one processor 1101, and the memory 1102 stores instructions that can be executed by the at least one processor 1101. In FIG. 11, a dashed line indicates that the memory 1102 is optional for the apparatus 1100.

The processor 1101 and the memory 1102 may be coupled through an interface circuit, or may be integrated together. This is not limited herein.

A specific connection medium between the processor 1101, the memory 1102, and the communication interface 1103 is not limited in this embodiment of this application. In this embodiment of this application, the processor 1101, the memory 1102, and the communication interface 1103 are connected through a bus 1104 in FIG. 11. The bus is represented by a bold line in FIG. 11. The connection manner between other components is merely an example for description, and is not limited thereto. The bus may be classified into an address bus, a data bus, a control bus, and the like. For ease of representation, only one bold line is used to represent the bus in FIG. 11, but this does not mean that there is only one bus or only one type of bus.

It should be understood that the processor mentioned in embodiments of this application may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

For example, the processor may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of example, and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be noted that the memory described in this specification aims to include but is not limited to these memories and any memory of another proper type.

Based on a same technical concept, an embodiment of this application further provides a computer-readable storage medium, including a program or instructions. When the program or the instructions are run on a computer, the method performed by the terminal device in embodiments shown in FIG. 5 to FIG. 7 is performed.

Based on a same technical concept, an embodiment of this application further provides a computer-readable storage medium, including a program or instructions. When the program or the instructions are run on a computer, the method performed by the network device in embodiments shown in FIG. 5 to FIG. 7 is performed.

Based on a same technical concept, an embodiment of this application further provides a chip. The chip is coupled to a memory, and is configured to read and execute program instructions stored in the memory, so that the method performed by the terminal device in embodiments shown in FIG. 5 to FIG. 7 is performed.

Based on a same technical concept, an embodiment of this application further provides a chip. The chip is coupled to a memory, and is configured to read and execute program instructions stored in the memory, so that the method performed by the network device in embodiments shown in FIG. 5 to FIG. 7 is performed.

According to a thirteenth aspect, a communication system is provided. The communication system includes a terminal device and a network device. The terminal device and the network device are configured to perform the method shown in FIG. 5.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid-state drive (solid state drive, SSD)), or the like.

Clearly, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A method for sending a hybrid automatic repeat request-acknowledgment HARQ-ACK, comprising:

receiving, by a terminal device, configuration information from a network device, wherein the configuration information indicates at least two common physical uplink control channel (PUCCH) resource sets configured by the network device for the terminal device, wherein the configuration information includes at least a first PUCCH resource indicator (PRI);

determining, by the terminal device, a first location of a first PUCCH resource from the at least two common PUCCH resource sets based on the at least first PRI; and sending, by the terminal device, HARQ-ACK information to the network device based on the first PUCCH resource.

2. The method according to claim 1, wherein the determining, by the terminal device, the first location of the first PUCCH resource from the at least two common PUCCH resource sets based on the at least first PRI includes:

determining, by the terminal device, the first location of the first PUCCH resource from the at least two common PUCCH resource sets based on the first PRI received from the network device, wherein a value of the first PRI is an integer greater than or equal to 0 and less than a first preset value, and the first preset value is a total quantity of PUCCH resources in the at least two common PUCCH resource sets.

3. The method according to claim 2, wherein the determining, by the terminal device, the first location of the first PUCCH resource from the at least two common PUCCH resource sets based on the first PRI received from the network device includes:

determining, by the terminal device, a value range within which the value of the first PRI falls, and determining, from the at least two common PUCCH resource sets, a common PUCCH resource set corresponding to the value range within which the value of the first PRI falls, wherein different common PUCCH resource sets in the at least two common PUCCH resource sets correspond to different value ranges; and determining, by the terminal device, based on the value of the first PRI, the first PUCCH resource from the common PUCCH resource set corresponding to the value range within which the value of the first PRI falls.

4. The method according to claim 3, wherein in response to the value of the first PRI falling within a first value range, the value of the first PRI is an index of the first PUCCH resource in a first common PUCCH resource set; or in response to the value of the first PRI falling within a second value range, the value of the first PRI minus a second preset value is an index of the first PUCCH resource in a second common PUCCH resource set.

5. The method according to claim 4, wherein an index of the first common PUCCH resource set plus a third preset value is an index of the second common PUCCH resource set.

6. The method according to claim 1, wherein the determining, by the terminal device, the first location of the first PUCCH resource from the at least two common PUCCH resource sets based on the at least first PRI includes:

determining, by the terminal device, a first common PUCCH resource set from the at least two common PUCCH resource sets; and determining, by the terminal device, the first location of the first PUCCH resource from the first common PUCCH resource set based on a second PRI from the network device, wherein the second PRI indicates a resource location of the first PUCCH resource in the first common PUCCH resource set.

7. The method according to claim 6, wherein the determining, by the terminal device, based on the at least first PRI, the first common PUCCH resource set from the at least two common PUCCH resource sets includes:

determining, by the terminal device, the first common PUCCH resource set from the at least two common PUCCH resource sets based on a common PUCCH resource set indicator received from the network device, wherein the common PUCCH resource set indicator indicates the first common PUCCH resource set in the at least two common PUCCH resource sets.

8. The method according to claim 6, wherein the at least two common PUCCH resource sets are associated with at least two uplink transmission resource configurations; and the determining, by the terminal device, based on the at least first PRI, the first common PUCCH resource set from the at least two common PUCCH resource sets based on the at least first PRI includes:

determining, by the terminal device, a first uplink transmission resource configuration used by the terminal device in an uplink transmission process, and determining the common PUCCH resource set associated with the first uplink transmission resource configuration as the first common PUCCH resource set.

9. The method according to claim 8, wherein the first uplink transmission resource configuration includes one or more of a PUSCH resource, a preamble set, a physical random access channel PRACH resource, or a coverage enhancement level.

10. The method according to claim 1, wherein any two PUCCH resources in the at least two common PUCCH resource sets are orthogonal in frequency domain.

11. A communication apparatus for sending a hybrid automatic repeat request-acknowledgment HARQ-ACK, comprising:

a transceiver, configured to receive configuration information from a network device, wherein the configuration information indicates at least two common physical uplink control channel (PUCCH) resource sets configured by the network device for the communication apparatus, wherein the configuration information includes at least a first PUCCH resource indicator (PRI);

a memory storing computer-readable instructions; and a processor connected to the memory, wherein the processor is configured to execute the computer-readable instructions to perform operations including:

determining a first location of a first PUCCH resource from the at least two common PUCCH resource sets based on the at least first PRI; and sending, via the transceiver, HARQ-ACK information to the network device based on the first PUCCH resource.

12. The communication apparatus according to claim 11, wherein the processor is specifically configured to:

determine the first location of the first PUCCH resource from the at least two common PUCCH resource sets based on the first PRI received by the transceiver from the network device, wherein the processor uses the first PRI to determine a resource location of the first PUCCH resource in the at least two common PUCCH resource sets, a value of the first PRI is an integer greater than or equal to 0 and less than a first preset value, and the first preset value is a total quantity of PUCCH resources in the at least two common PUCCH resource sets.

13. The communication apparatus according to claim 12, wherein the processor is specifically configured to:

determine a value range within which the value of the first PRI falls, and determine, from the at least two common PUCCH resource sets, a common PUCCH resource set corresponding to the value range within which the value of the first PRI falls, wherein different common PUCCH resource sets in the at least two common PUCCH resource sets correspond to different value ranges; and determine, based on the value of the first PRI, the first PUCCH resource from the common PUCCH resource set corresponding to the value range within which the value of the first PRI falls.

14. The communication apparatus according to claim 13, wherein the processor is further configured to:

in response to the value of the first PRI falling within a first value range, determine the value of the first PRI is an index of the first PUCCH resource in a first common PUCCH resource set; or in response to the value of the first PRI falling within a second value range, determine the value of the first PRI minus a second preset value is an index of the first PUCCH resource in a second common PUCCH resource set.

15. The communication apparatus according to claim 14, wherein the processor is further configured to:

determine an index of the first common PUCCH resource set plus a third preset value is an index of the second common PUCCH resource set.

16. The communication apparatus according to claim 11, wherein the processor is specifically configured to:

determine the first location of the first common PUCCH resource set from the at least two common PUCCH resource sets based on the at least first PRI; and determine the first location of the first PUCCH resource from the first common PUCCH resource set based on a second PRI received by the transceiver from the network device, wherein the second PRI indicates a resource location of the first PUCCH resource in the first common PUCCH resource set.

17. The communication apparatus according to claim 16, wherein in response to determining the first location of the first common PUCCH resource set from the at least two common PUCCH resource sets based on the at least first PRI, the processor is specifically configured to:

determine the first location of the first common PUCCH resource set from the at least two common PUCCH resource sets based on a common PUCCH resource set indicator from the network device, wherein the common PUCCH resource set indicator indicates the first common PUCCH resource set in the at least two common PUCCH resource sets.

18. The communication apparatus according to claim 16, wherein the at least two common PUCCH resource sets are associated with at least two uplink transmission resource configurations; and in response to determining the first common PUCCH resource set from the at least two common PUCCH resource sets, the processor is specifically configured to:

determine a first uplink transmission resource configuration useable in an uplink transmission process, and determine a common PUCCH resource set associated with the first uplink transmission resource configuration as the first common PUCCH resource set.

19. The communication apparatus according to claim 18, wherein the first uplink transmission resource configuration includes one or more of a PUSCH resource, a preamble set, a physical random access channel PRACH resource, or a coverage enhancement level.

20. The communication apparatus according to claim 11, wherein any two PUCCH resources in the at least two common PUCCH resource sets are orthogonal in frequency domain.

* * * * *